United States Patent
Park et al.

(10) Patent No.: US 10,963,014 B1
(45) Date of Patent: Mar. 30, 2021

(54) FLEXIBLE DISPLAY DEVICE

(71) Applicant: LG ELECTRONICS INC., Seoul (KR)

(72) Inventors: Jin Woo Park, Seoul (KR); Ara Kim, Seoul (KR); Hang Seok Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/986,053

(22) Filed: Aug. 5, 2020

(30) Foreign Application Priority Data

May 7, 2020 (WO) ................ PCT/KR2020/006009

(51) Int. Cl.
*G06F 1/16* (2006.01)
*H04B 1/3827* (2015.01)
*H04M 1/02* (2006.01)

(52) U.S. Cl.
CPC .......... *G06F 1/1652* (2013.01); *G06F 1/1624* (2013.01); *G06F 1/1675* (2013.01); *H04B 1/3827* (2013.01); *H04M 1/0237* (2013.01); *H04M 1/0268* (2013.01)

(58) Field of Classification Search
CPC .. G06F 1/1624; G06F 1/1652; H04M 1/0237; H04M 1/0268
See application file for complete search history.

(56) References Cited

U.S. PATENT DOCUMENTS

| 8,711,566 | B2 * | 4/2014 | O'Brien | G06F 1/1624 |
| | | | | 361/724 |
| 10,193,095 | B2 * | 1/2019 | Seo | G06F 1/1601 |
| 10,321,583 | B2 * | 6/2019 | Seo | H05K 5/0017 |
| 10,547,718 | B2 * | 1/2020 | Lee | H04B 1/3888 |
| 2012/0212433 | A1 * | 8/2012 | Lee | G06F 1/1652 |
| | | | | 345/173 |

(Continued)

FOREIGN PATENT DOCUMENTS

| EP | 3531230 | 8/2019 |
| KR | 10-110712 | 1/2012 |

(Continued)

OTHER PUBLICATIONS

European Patent Office Application Serial No. 20191288.8, Search Report dated Feb. 4, 2021, 8 pages.

(Continued)

*Primary Examiner* — Nidhi Thaker
(74) *Attorney, Agent, or Firm* — Lee, Hong, Degerman, Kang & Waimey PC

(57) ABSTRACT

A flexible display device is disclosed. The flexible display device includes a first body, a second body, a roller, and a flexible display. The flexible display includes a first region forming a plane surface and a second region of which a portion forms a curved surface around the roller. A plurality of engagement protrusions are formed on an outer circumferential surface of the roller, and a plurality of support bars are coupled to an inner surface of the second region. The engagement protrusions engage the support bars. When the second body moves relative to the first body, the roller rotates with the engagement protrusions engaging the support bars, and the second region is uniformly deformed and moves.

17 Claims, 18 Drawing Sheets

(56) References Cited

U.S. PATENT DOCUMENTS

| | | | |
|---|---|---|---|
| 2013/0222293 A1* | 8/2013 | Chung, II | G06F 1/1652 345/173 |
| 2017/0064847 A1 | 3/2017 | Lim | |
| 2017/0364119 A1* | 12/2017 | Lee | G06F 1/1652 |
| 2019/0268455 A1* | 8/2019 | Baek | G06F 1/1624 |
| 2019/0305237 A1* | 10/2019 | Shin | H01L 27/3234 |
| 2019/0310686 A1* | 10/2019 | Lee | G06F 1/1688 |

FOREIGN PATENT DOCUMENTS

| | | |
|---|---|---|
| KR | 1020160098677 | 8/2016 |
| KR | 1020170116551 | 10/2017 |
| KR | 1020190077107 | 7/2019 |
| KR | 1020190101605 | 9/2019 |
| KR | 1020190113128 | 10/2019 |
| WO | 2016018300 | 2/2016 |
| WO | 2019146865 | 8/2019 |
| WO | 2020241926 | 12/2020 |

OTHER PUBLICATIONS

PCT International Application No. PCT/KR2020/006009, International Search Report dated Feb. 2, 2021, 3 pages.

\* cited by examiner

[Fig. 1]
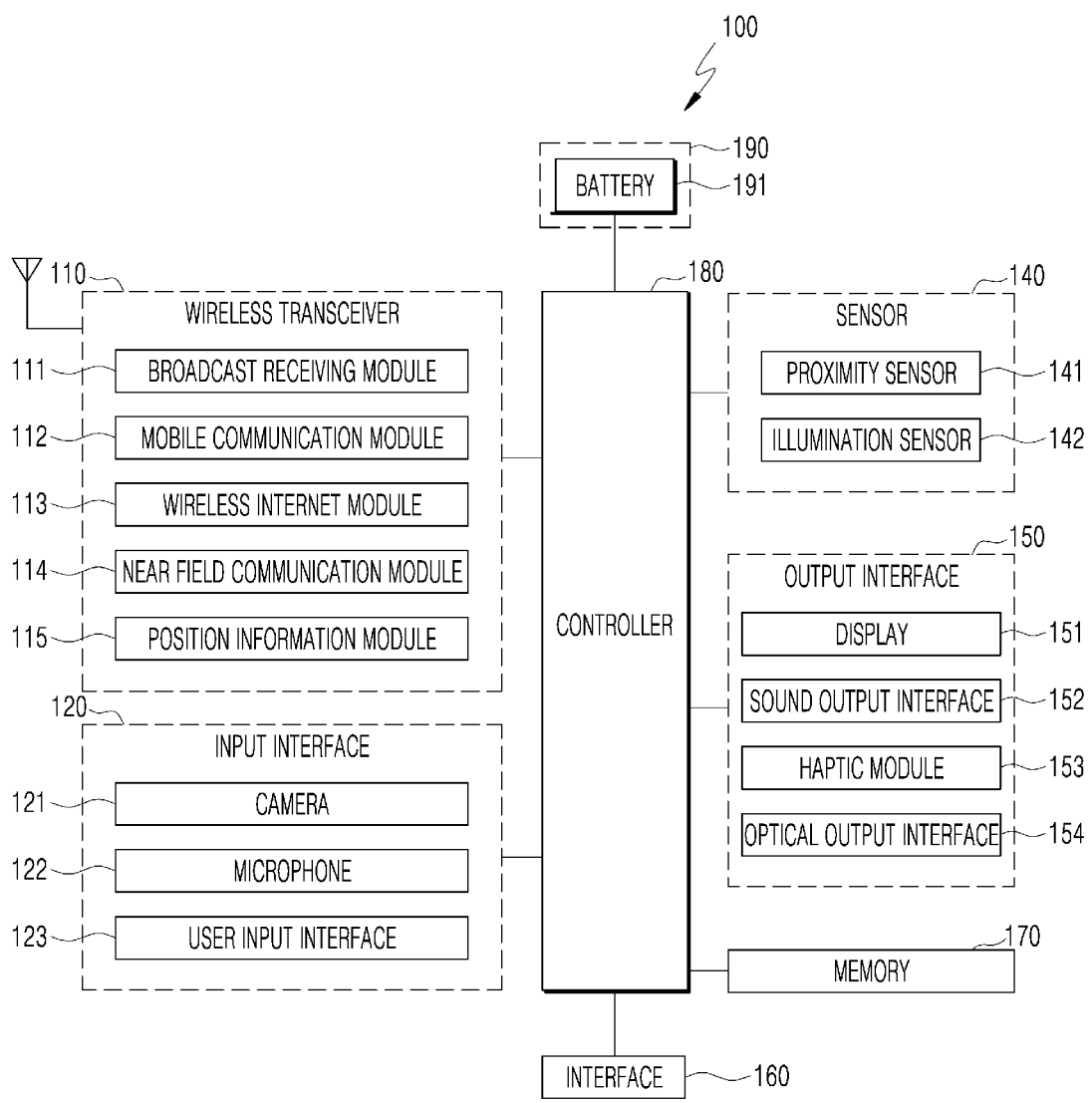

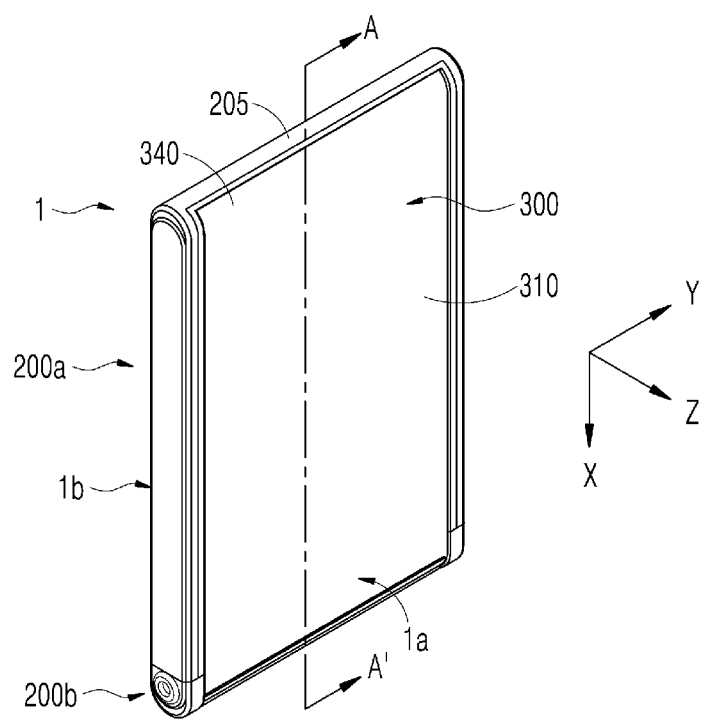
[FIG. 2a]

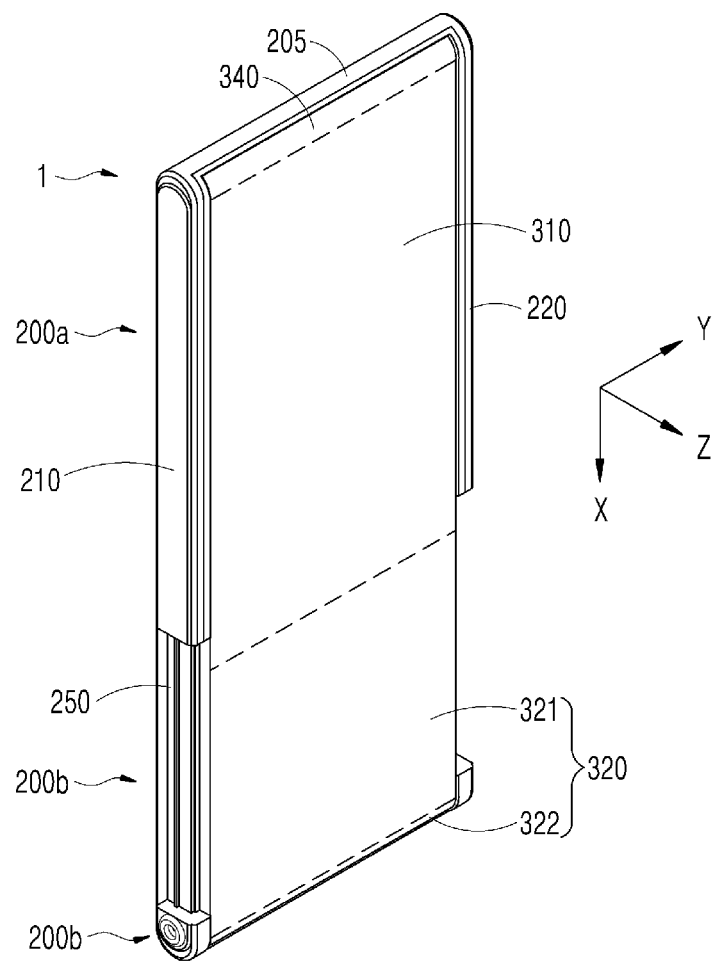

[FIG. 3a]
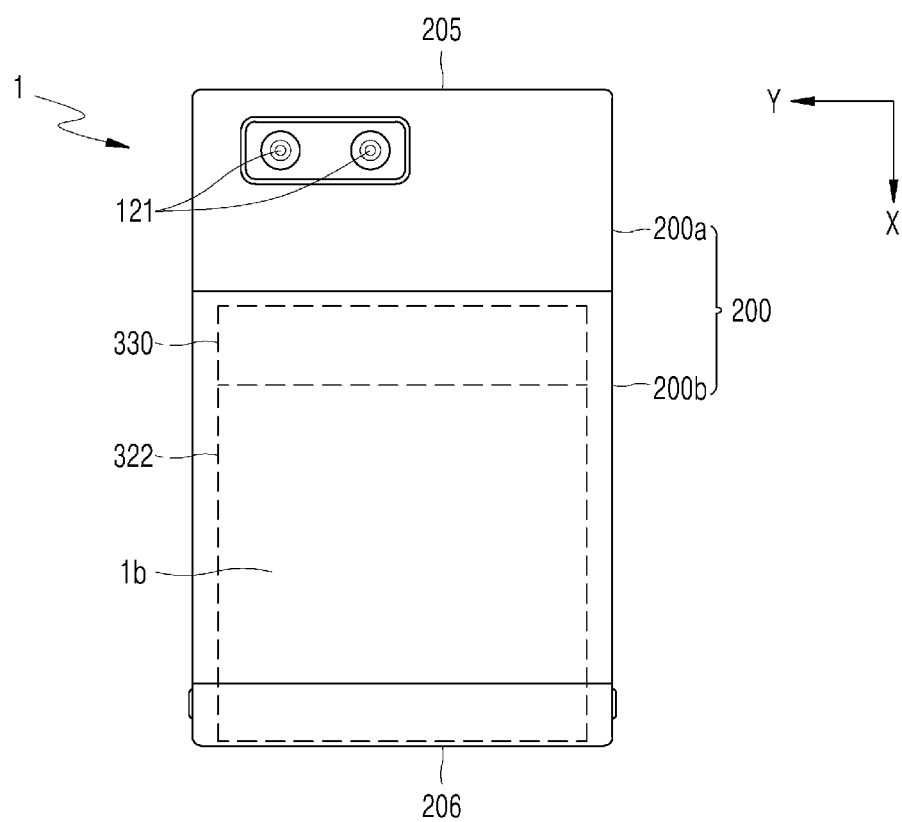

[FIG. 3b]
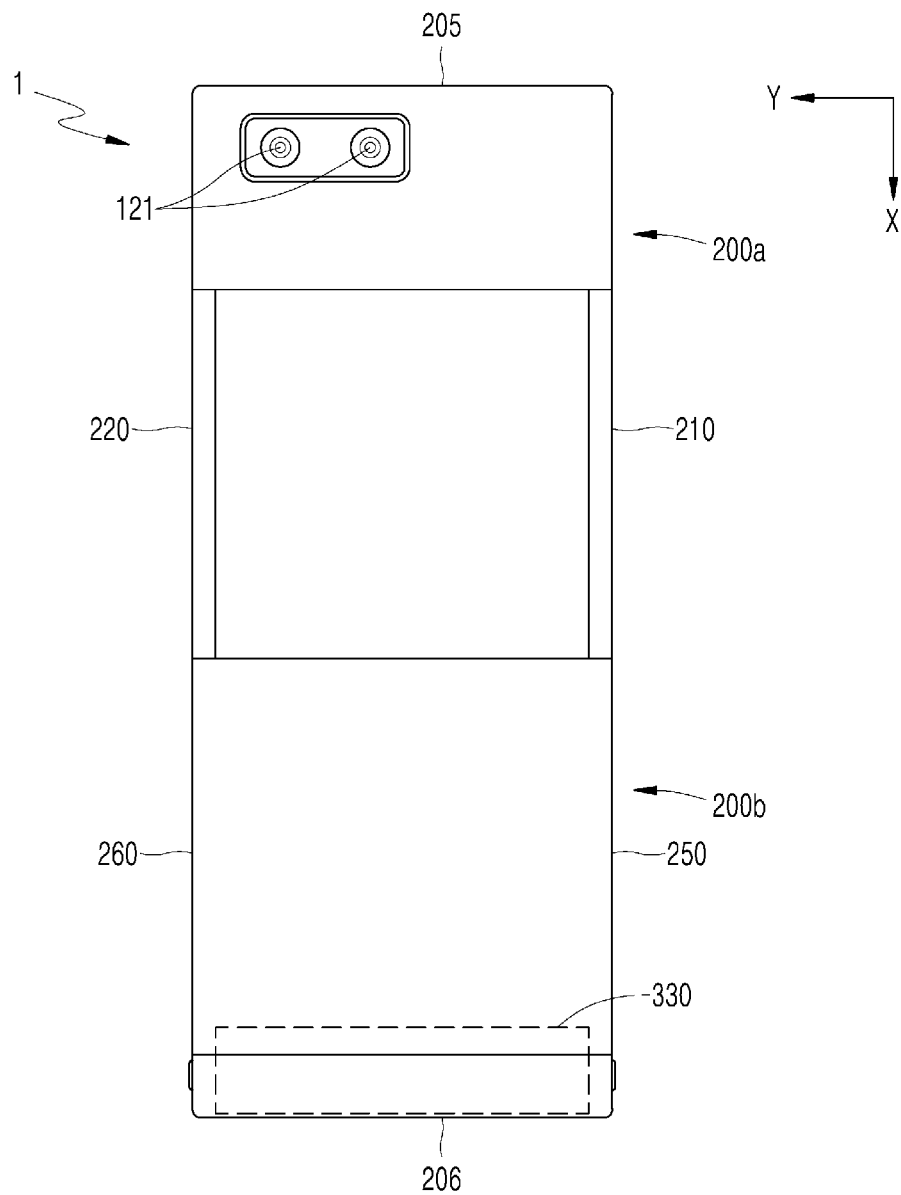

[FIG. 4]
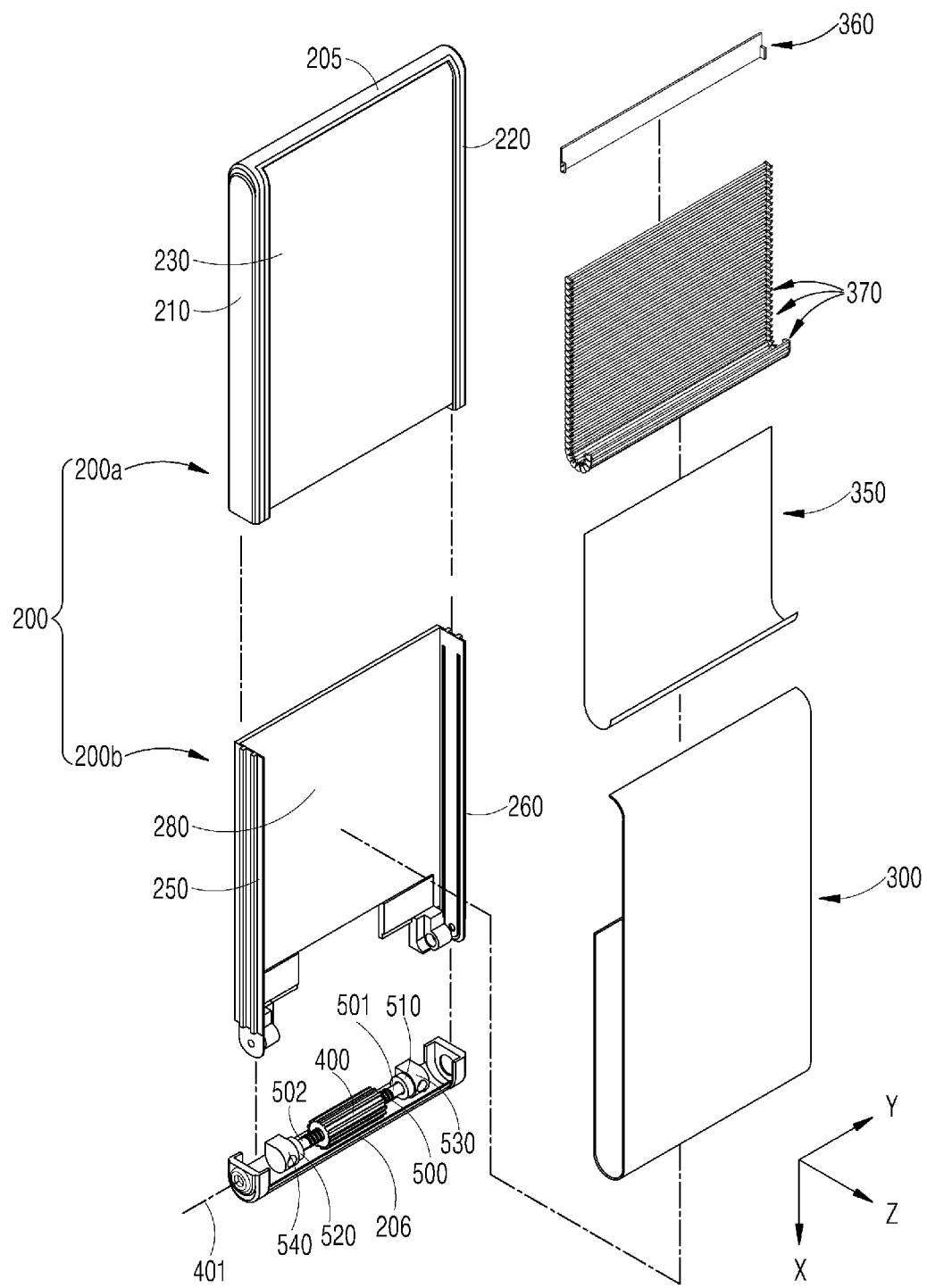

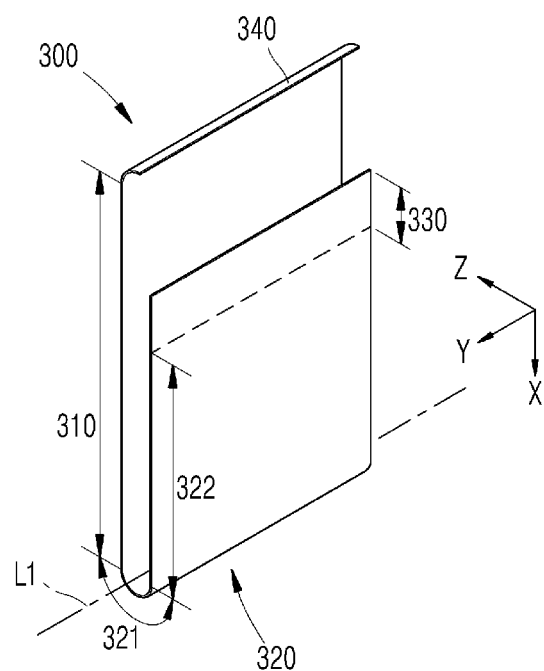
[FIG. 5a]

[FIG. 5b]
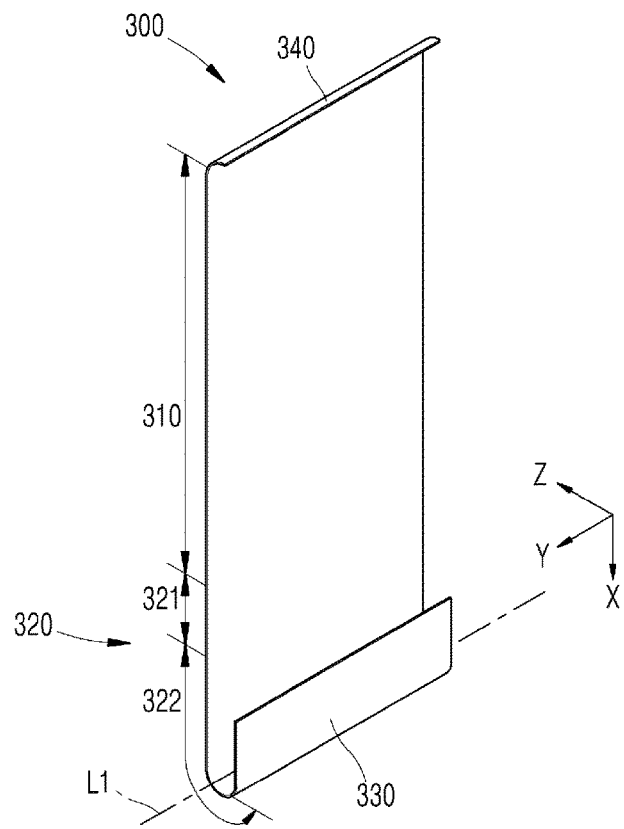
[FIG. 6a]
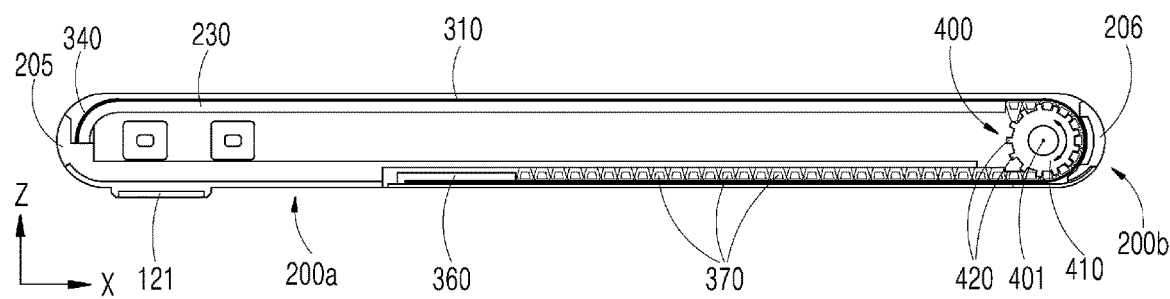

[FIG. 6b]
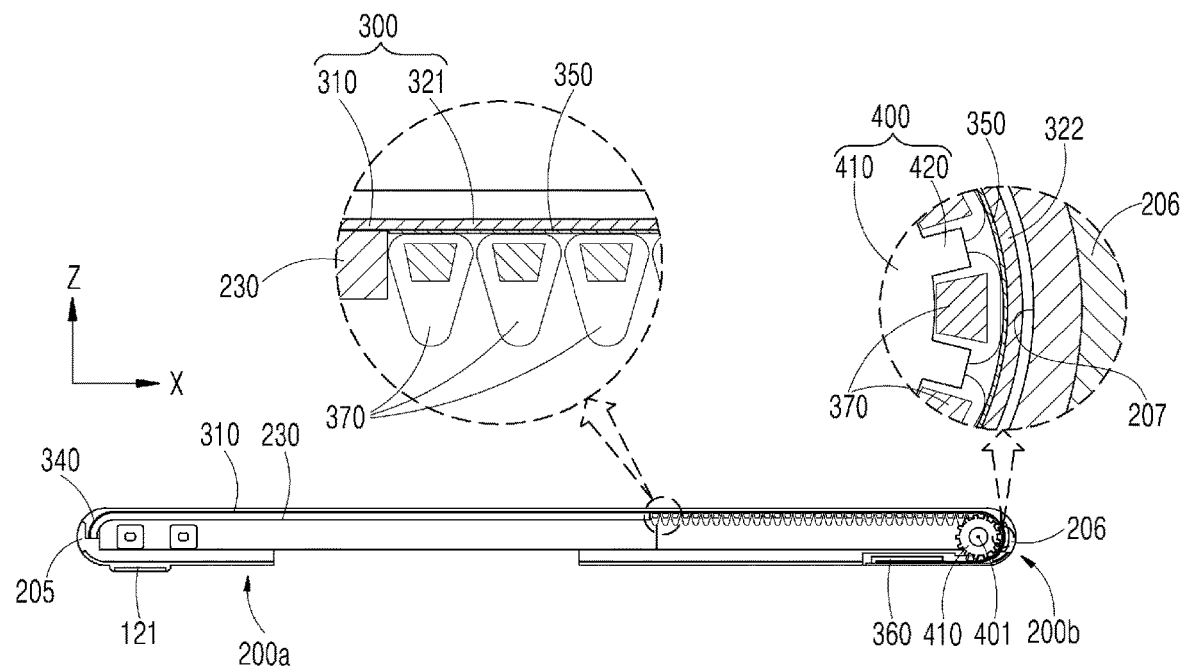
[FIG. 7a]
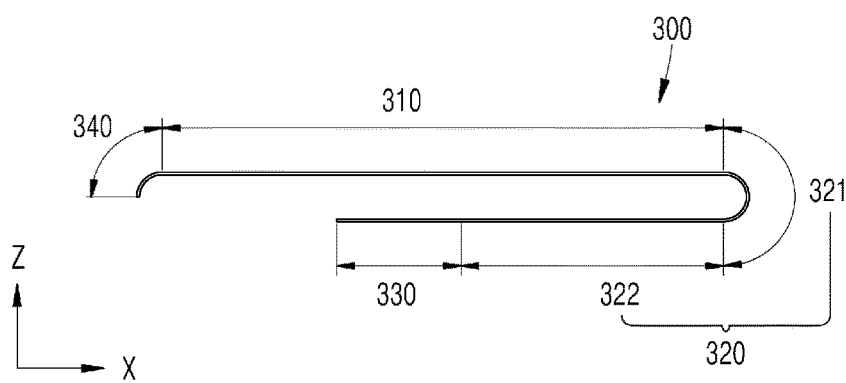

[FIG. 7b]
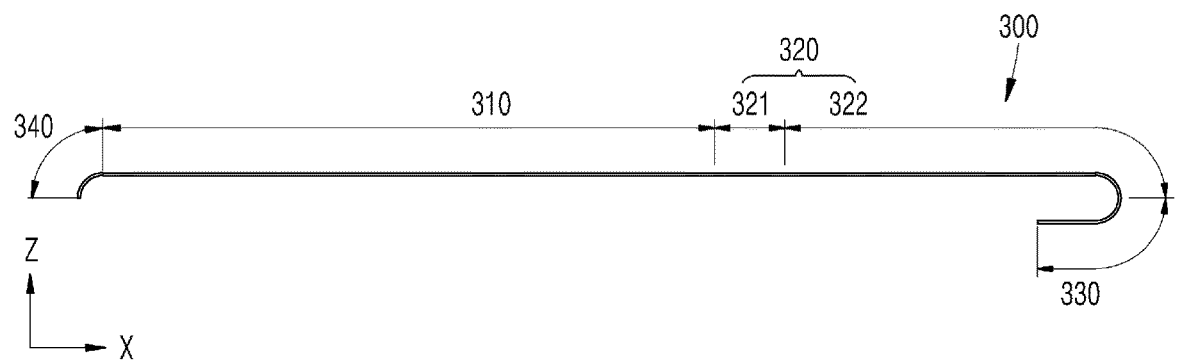
[FIG. 8]
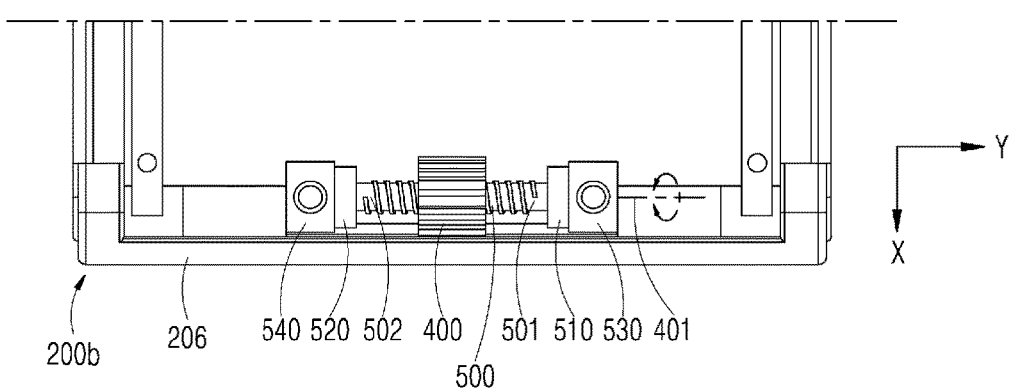

[FIG. 9a]
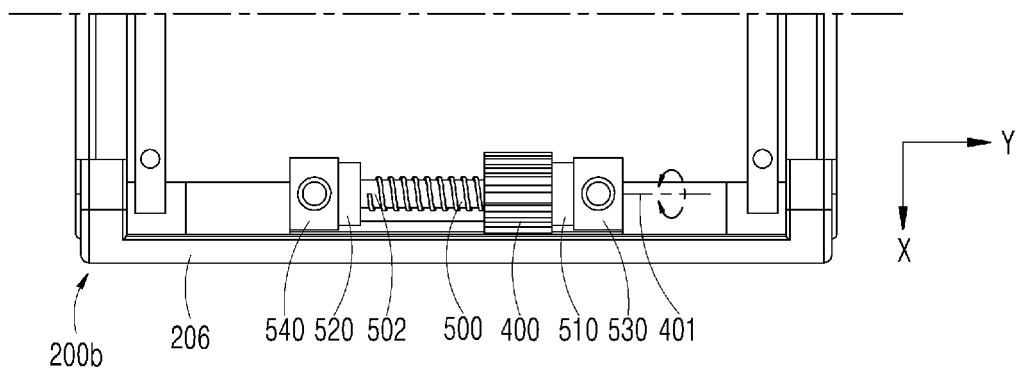
[FIG. 9b]
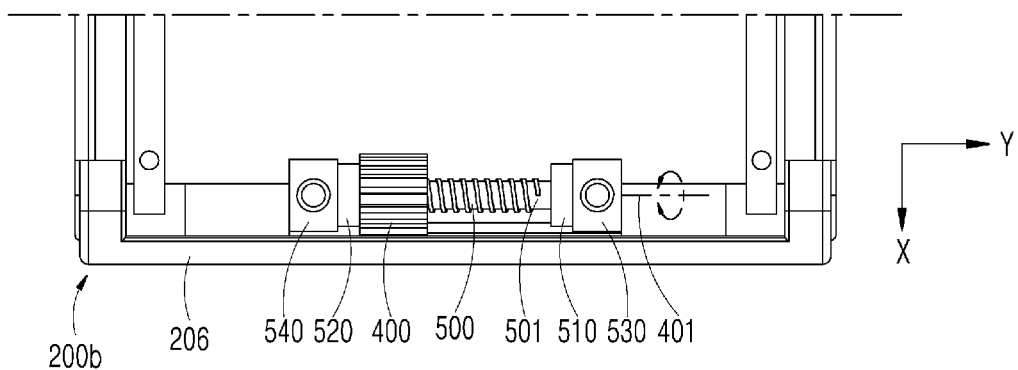
[FIG. 10]
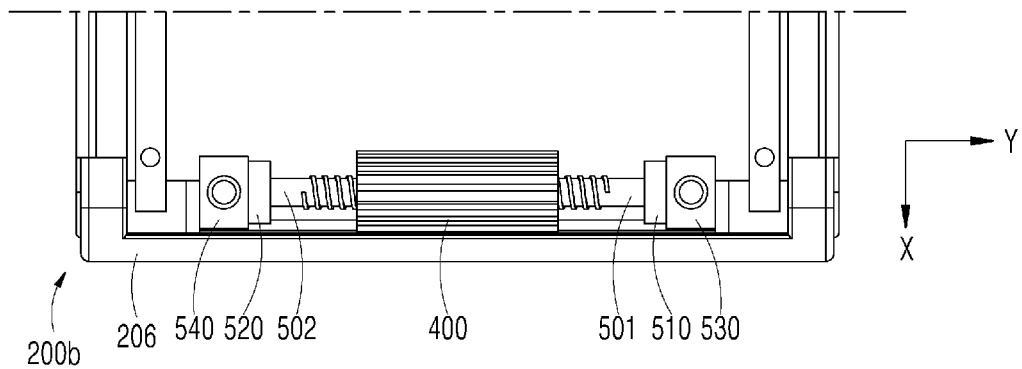

[FIG. 11a]
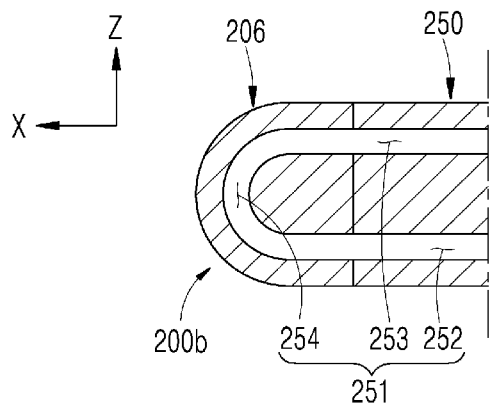
[FIG. 11b]
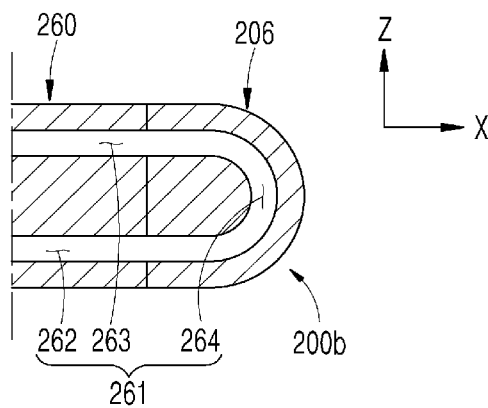
[FIG. 12]
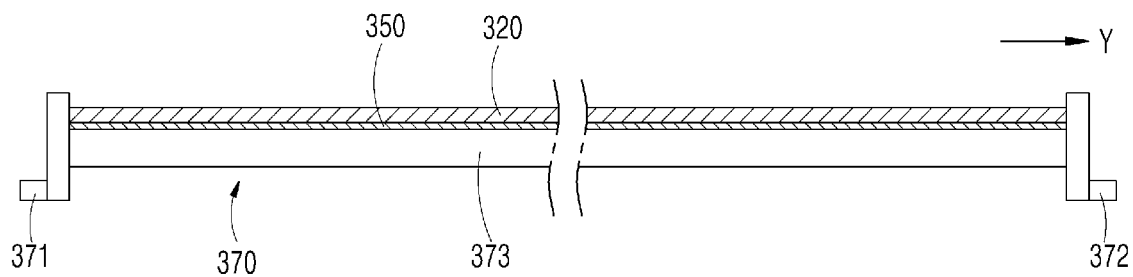

[FIG. 13a]
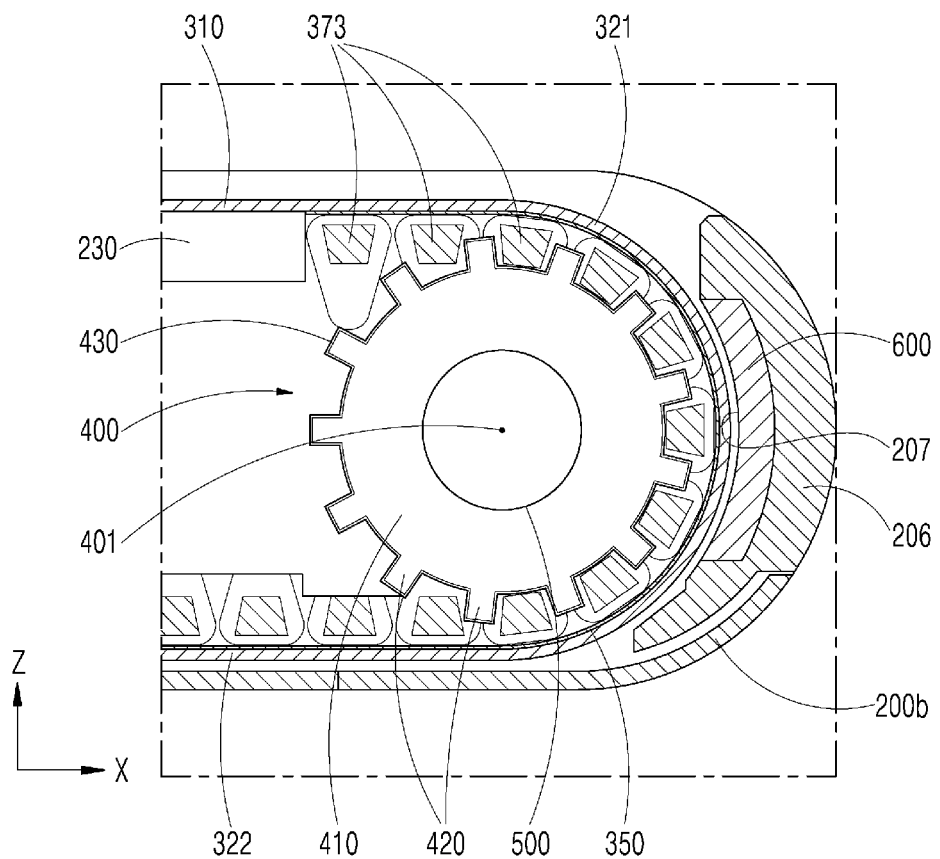

[FIG. 13b]
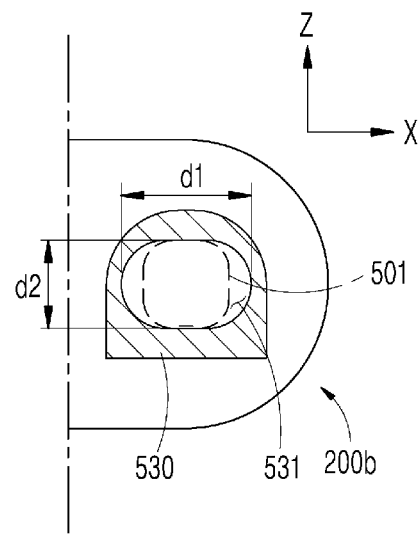
[FIG. 13c]
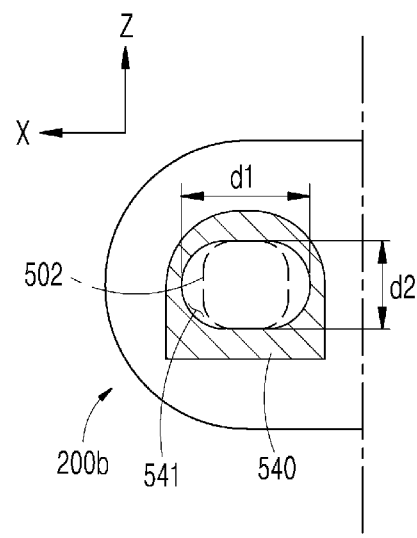

[FIG. 14]
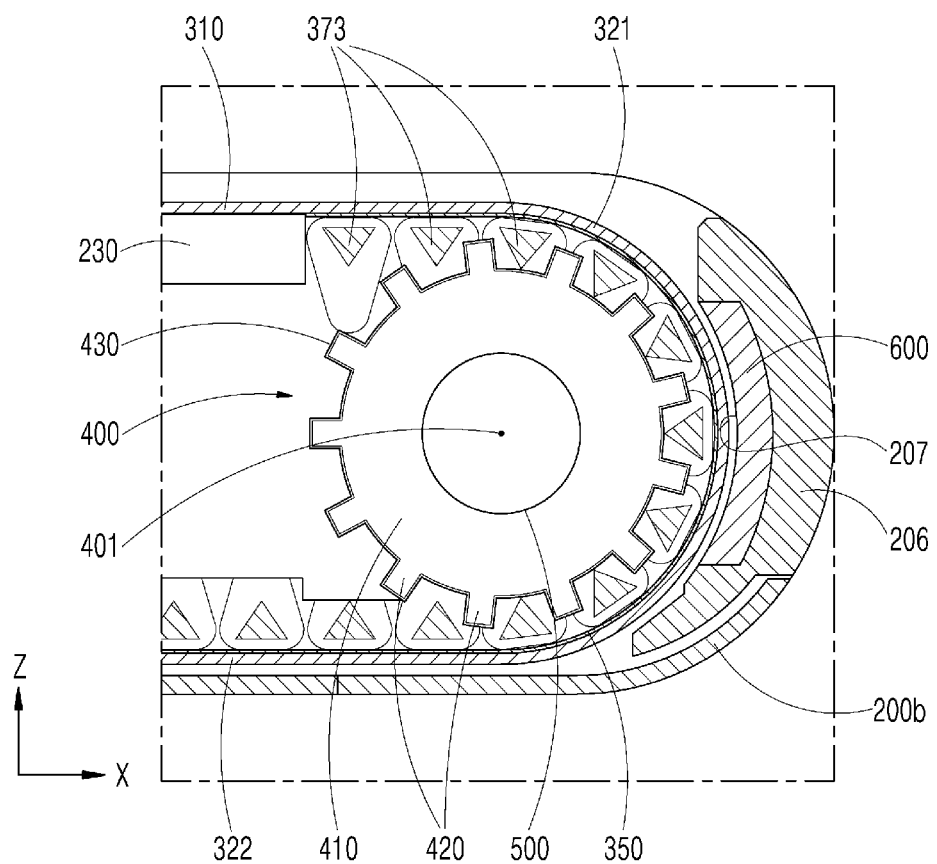

[FIG. 15a]
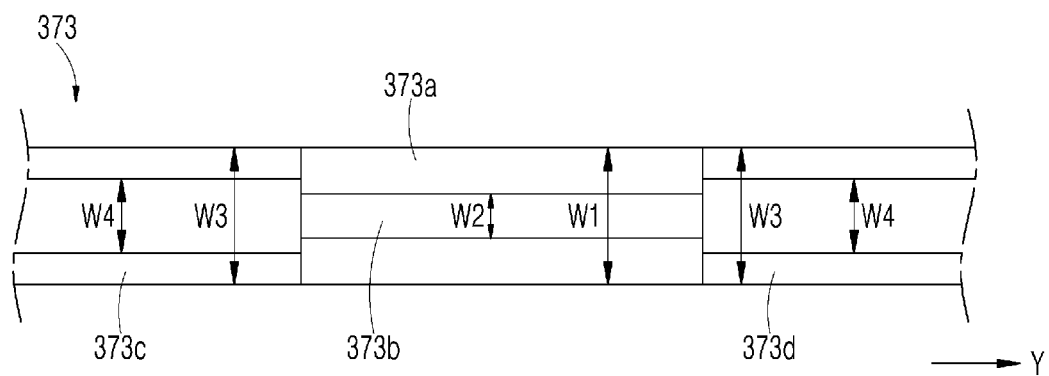
[FIG. 15b]
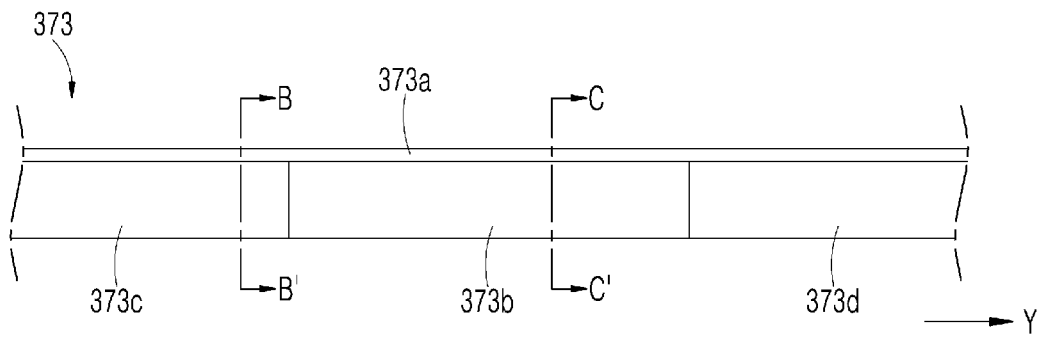

[FIG. 15c]
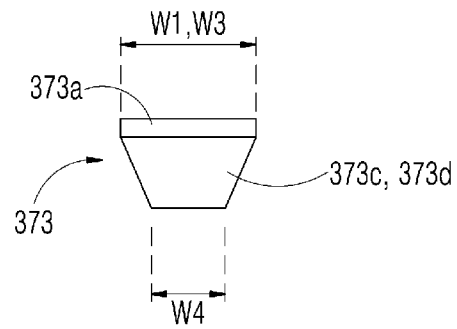
[FIG. 15d]
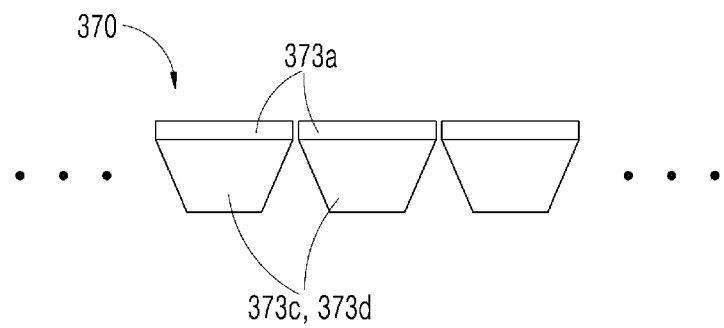
[FIG. 15e]
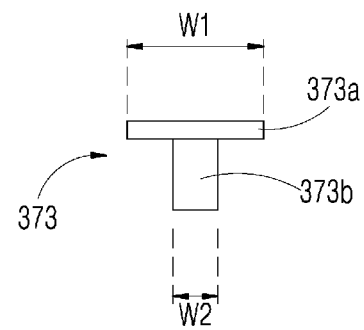

[FIG. 15f]
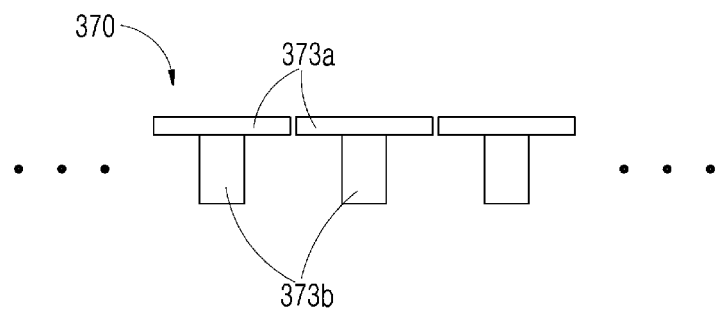
[FIG. 16]
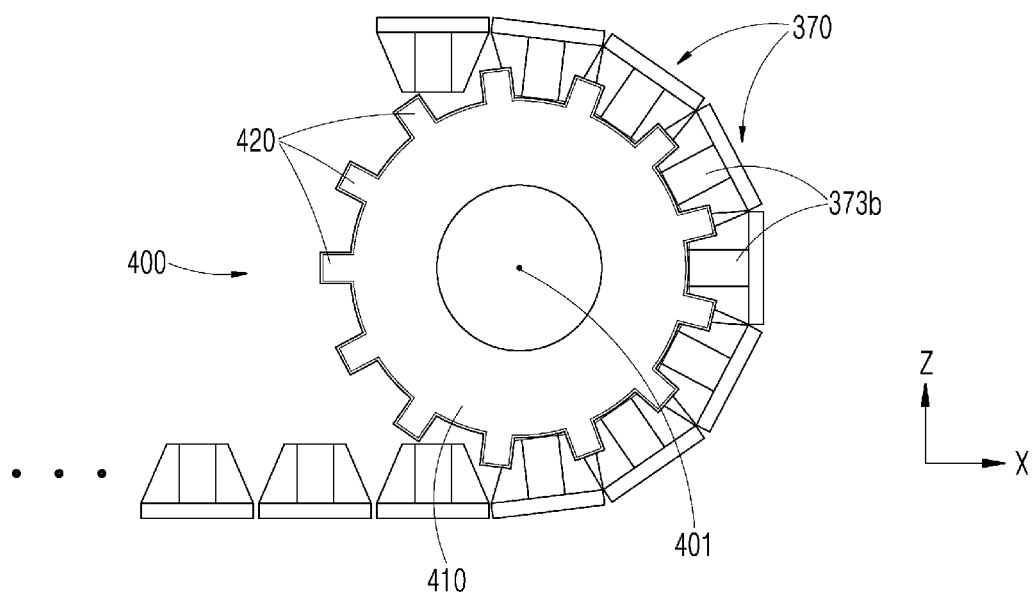

FLEXIBLE DISPLAY DEVICE

CROSS-REFERENCE TO RELATED APPLICATION

Pursuant to 35 U.S.C. § 119, this application claims the benefit of an earlier filing date and right of priority to International Application No. PCT/KR2020/006009, filed on May 7, 2020, the contents of which are hereby incorporated by reference herein in its entirety.

BACKGROUND

1. Technical Field

The present disclosure relates to a device including a flexible display and, more particularly, to a portable device including a flexible display characterized in that the size of the device is changed as two bodies slide with respect to each other.

2. Description of Related Art

With the development of flexible displays that can be bent while displaying image information thereon, research and development is underway to provide a foldable device by applying a flexible display to a device having two bodies and a folding structure (for example, a hinge unit). In such a foldable device, since the flexible display may be disposed to completely cover the two bodies and the folding structure, a relatively large-sized display can be implemented in the device.

As another device using a flexible display, a rollable device having a structure in which a display is rolled up has been studied and developed. In such a rollable device, as the flexible display is rolled, the total size or area of the display can be reduced. On the contrary, as the flexible display is unrolled, the size or area of the display can be increased.

As still another device using a flexible display, there is a device in which as two bodies slide with respect to each other, a flexible display having a U-shape due to a curved middle portion thereof is deformed such that a surface area of the flexible display seen from one side thereof changes.

As related art using a flexible display, Korean Patent Registration No. 1107127 (hereinafter referred to as "related art") discloses a mobile terminal including a terminal body, a sliding member, a flexible display, and a rotational shaft.

The mobile terminal having such a structure as that of the related art may be stored for a relatively long period of time with the flexible display bent into a U-shape in the middle thereof. Here, when the mobile terminal (i.e. flexible display device) is deformed, the U-shaped bent portion of the flexible display may not be fully spread out, and a flat portion of the flexible display may not be completely bent into a U-shape. These limits are because of plastic deformation occurring in a part of the flexible display, springback, and/or elasticity of the flexible display.

Accordingly, considering such characteristics of the flexible display caused by deformation, development of a flexible display device that works accurately and stably is required.

SUMMARY OF THE INVENTION

An aspect of the present disclosure is directed to providing a flexible display device having a means for maintaining constant the amount of movement of a portion of a flexible display that changes direction on a roller when the flexible display is deformed as two bodies move with respect to each other.

Another aspect of the present disclosure is directed to providing a flexible display device in which a flexible display is deformed as two bodies move with respect to each other, characterized in that the flexible display device has a means by which a portion of the flexible display is positioned at a correct position without slipping on a roller.

Still another aspect of the present disclosure is directed to providing a flexible display device in which a flexible display is deformed as two bodies move with respect to each other, characterized in that the flexible display device has a means for pulling the flexible display such that U-shape of the flexible display is stably maintained, and a predetermined tension is applied to the flexible display.

A flexible display device according to an embodiment of the present disclosure may be formed to be held and carried by a user.

The flexible display device may include a first body, a second body, a roller, a flexible display, and a plurality of support bars.

The second body may reciprocate relative to the first body along a first direction between a first position and a second position. The first position may be a relative position of the second body with respect to the first body, and the second position may also be a relative position of the second body with respect to the first body.

When the second body is in the first position relative to the first body, the flexible display device may be in a first state, and when the second body is in the second position relative to the first body, the flexible display device may be in a second state. Accordingly, in the description of the present disclosure, "the first position" may be used in the same sense as "the first state of the flexible display device," and "the second position" may be used in the same sense as "the second state of the flexible display device."

The roller may be coupled to the second body in such a manner that the roller can rotate about a rotational axis in a second direction, which is perpendicular to the first direction. In addition, a plurality of engagement protrusions may be repeatedly formed on an outer circumferential surface of the roller.

The flexible display may include a first region and a second region.

A portion of the second region may be bent into a semicircular shape, and as the second body moves, the bent position in the second region may be changed.

A portion of the second region may be curved about a curvature center line, which coincides with the rotational axis of the roller, to form a curved surface.

The second region may include a first connected region and a second connected region.

The first region may be fixed in front of the first body to face forward. The first region may form a front surface of the flexible display device. The first region may be formed of a plane surface.

The first connected region may extend from the first region.

The second connected region may extend from the first connected region.

When the second body is in the first position, the first connected region may be bent into a curved surface, and the second connected region may be parallel to the first region.

When the second body is in the first position, the first connected region may be bent into a curved surface around the roller. When the second body is in the first position, the first connected region may be curved around the roller to form a curved surface. When the second body is in the first position, the first connected region may form a curved surface of a semicircular shape about the curvature center line.

When the second body is in the second position, the first connected region may form a single plane with the first region, and a portion of the second connected region may be bent into a curved surface.

When the second body is in the second position, a portion of the second connected region may be bent into a curved surface around the roller. When the second body is in the second position, a portion of the second connected region may be curved around the roller to form a curved surface. When the second body is in the second position, the second connected region may form a curved surface of a semicircular shape about the curvature center line.

The plurality of support bars may be formed to extend in the second direction, and may be fixed to an inner surface of the second region.

The support bars that are fixed to an inner side of a region of the second region that forms a curved surface about the curvature center line may engage the engagement protrusions.

The support bars that engage the engagement protrusions may form a semicircular shape.

The flexible display device may further include a screw shaft.

The screw shaft may form a rotational shaft of the roller and may be coupled to the second body. The roller may be screwed onto the screw shaft.

The screw shaft may be coupled to the second body in such a manner that the screw shaft does not move with respect to the second body along the second direction. Accordingly, when the roller rotates relative to the screw shaft, the roller may move along the second direction.

When the second body moves between the first position and the second position, the roller may make two to three rotations.

The flexible display device may further include a first stopper and a second stopper.

The first stopper and the second stopper may respectively be fixed to opposite end portions of the screw shaft so as to limit ranges of movement and rotation of the roller.

When the second body is in the first position, the roller may come into close contact with the first stopper, and when the second body is in the second position, the roller may come into close contact with the second stopper.

When the second body is in the first position, an attractive force may act between the roller and the first stopper, such that the roller comes into close contact with the first stopper or moves close to the first stopper.

When the second body is in the second position, an attractive force may act between the roller and the second stopper, such that the roller comes into close contact with the second stopper or moves close to the second stopper.

Each of the first stopper and the second stopper may be made of a magnet.

The roller may be made of metal such that an attractive force acts between the roller and each of the first and second stoppers.

The flexible display device may further include a tension maintaining part.

The tension maintaining part may be disposed at an outer side of the roller, and a gap may be formed between the tension maintaining part and the roller such that the second region moves through the gap.

The tension maintaining part may be made of a magnet.

The roller may be made of metal such that an attractive force acts between the roller and the tension maintaining part.

The roller may be coupled to the second body so as to reciprocate along a direction parallel to the first direction.

Each of the plurality of engagement protrusions may protrude from the roller in a radial direction thereof and may have a rectangular cross section, wherein the cross section may be constant along the second direction.

The plurality of the engagement protrusions may be identical to one another and may be disposed to be spaced apart from each other at regular intervals.

Each of the plurality of support bars may protrude from an inner surface of the second region in a vertical direction thereof and may have a rectangular cross section at a portion thereof coming into contact with the engagement protrusions, wherein the cross section may be constant along the second direction.

The plurality of the support bars may be identical to one another and may be disposed to be spaced apart from each other at regular intervals.

Each of the plurality of the support bars may include a support portion, an engagement portion, and a non-engagement portion.

The support portion may be formed to extend along the second direction, and may have a width of W1.

The engagement portion may protrude inwards from an inner surface of the support portion, may come into contact with the engagement protrusions, and may have a width of W2.

The non-engagement portion may form a different section from the engagement portion in the second direction and may protrude inwards from an inner surface of the support portion, wherein a root width of the non-engagement portion may be W3, and a tip width of the non-engagement portion may be W4.

The flexible display device may be formed such that $W1 \geq W3 > W4 \geq W2$.

Each of the plurality of the support bars may include a first support slider, a second support slider, and a connection arm.

The first support slider may form one end portion of a support bar.

The second support slider may form the other end portion of the support bar at the opposite side to the first support slider.

The connection arm may connect the first support slider to the second support slider and may support the second region.

The second body may include a first movement guide groove and a second movement guide groove.

The first movement guide groove may be formed as a U-shaped groove to form a path into which the first support slider is inserted and through which the first support slider moves.

The second movement guide groove may be formed as a U-shaped groove to form a path into which the second support slider is inserted and through which the second support slider moves.

The first movement guide groove may include a first rear guide groove, a first front guide groove, and a first connection guide groove.

The first rear guide groove may be formed as a groove extending along the first direction.

The first front guide groove may be formed as a groove extending along the first direction and may be positioned in front of the first rear guide groove.

The first connection guide groove may form a semicircular shape about the rotational axis of the roller and may be formed as a groove connecting the first rear guide groove and the first front guide groove.

The second movement guide groove may include a second rear guide groove, a second front guide groove, and a second connection guide groove.

The second rear guide groove may be positioned in the opposite side of the flexible display to the first rear guide groove, and may be formed as a groove extending along the first direction.

The second front guide groove may be positioned in the opposite side of the flexible display to the first front guide groove, may be formed as a groove extending along the first direction, and may be positioned in front of the second rear guide groove.

The second connection guide groove may form a semicircular shape about the rotational axis of the roller and may be formed as a groove connecting the second rear guide groove and the second front guide groove.

The first support slider may be inserted into the first rear guide groove, the first connection guide groove, and the first front guide groove, and move therethrough.

The second support slider may be inserted into the second rear guide groove, the second connection guide groove, and the second front guide groove, and move therethrough.

The first body may include a support plate which supports the first region from inside the first region.

A front surface of the support plate may form a single plane with a front surface of the connection arm that is coupled to an inner side of a region of the second region that forms a single plane with the first region.

The flexible display device may include an inner plate.

The inner plate may be formed of a metal plate that has elasticity and is bendable, and may be coupled to an inner surface of the second region.

When the inner plate is provided in the flexible display device, the plurality of support bars may be coupled to the flexible display by means of the inner plate.

The plurality of support bars may be fixed to an inner surface of the inner plate.

The plurality of engagement protrusions may be coated with a coating layer, and the coating layer may be made of a material having superior lubricity or greater elasticity than the engagement protrusions.

In the flexible display device according to embodiments of the present disclosure, the support bars that are fixed to an inner side of a region of the second region that forms a curved surface about the curvature center line may engage the engagement protrusions of the roller. When the flexible display is deformed as the second body moves relative to the first body, the roller may be rotated as the plurality of support bars move, and the support bars may engage the engagement protrusions, to thereby move sequentially and rotate. Accordingly, the amount of movement of a portion of the flexible display that changes direction on the roller may be constant.

The flexible display device according to embodiments of the present disclosure may include a screw shaft, a first stopper, and a second stopper. The first stopper and the second stopper may limit ranges of movement and rotation of the roller and may be made of a magnet. The roller may be made of metal such that an attractive force acts between the roller and each of the first and second stoppers. When the flexible display device is in the first state or in the second state, and no external force is applied, rotation of the roller may be prevented, and movement of the support bars may be blocked. Accordingly, a portion of the flexible display may not slip on the roller, and the shape of the flexible display may be stably maintained.

The flexible display device according to embodiments of the present disclosure may include a tension maintaining part. The tension maintaining part may be made of a magnet. The roller may be made of metal such that an attractive force acts between the roller and the tension maintaining part, and may be coupled to the second body so as to reciprocate along a direction parallel to the first direction. Accordingly, the roller may stably support an inner surface of the second region, and the U-shape of the flexible display may be stably maintained.

BRIEF DESCRIPTION OF THE DRAWINGS

The foregoing and other aspects, features, and advantages of the invention, as well as the following detailed description of the embodiments, will be better understood when read in conjunction with the accompanying drawings. For the purpose of illustrating the present disclosure, there is shown in the drawings an exemplary embodiment, it being understood, however, that the present disclosure is not intended to be limited to the details shown because various modifications and structural changes may be made therein without departing from the spirit of the present disclosure and within the scope and range of equivalents of the claims. The use of the same reference numerals or symbols in different drawings indicates similar or identical items.

FIG. 1 is a block diagram for explaining a flexible display device.

FIG. 2a is a perspective view of a flexible display device in a first state, and FIG. 2b is a perspective view of the flexible display device of FIG. 2a in a second state in which the flexible display device has been deformed.

FIG. 3a is a rear view of the flexible display device of FIG. 2a, and FIG. 3b is a rear view of the flexible display device of FIG. 2b.

FIG. 4 is an exploded perspective view of the flexible display device of FIG. 2a.

FIG. 5a is a perspective view of a flexible display separated from the flexible display device in the first state, and FIG. 5b is a perspective view of the flexible display of FIG. 5a when the flexible display has been deformed (i.e. when the flexible display device is in a second state).

FIG. 6a is a cross-sectional view of the flexible display device of FIG. 2a taken along the line A to A'. FIG. 6b is a cross-sectional view of the flexible display device of FIG. 6a when the flexible display device has been deformed.

FIG. 7a is a cross-sectional view of the flexible display separated from the flexible display device of FIG. 6a, and FIG. 7b is a cross-sectional view of the flexible display separated from the flexible display device of FIG. 6b.

FIG. 8 is a plane view of a flexible display device illustrating some elements therein.

FIG. 9a and FIG. 9b are views illustrating the roller illustrated in FIG. 8 moving while rotating about a screw shaft.

FIG. 10 is a plane view illustrating some elements inside a flexible display device.

FIG. 11a is a cross-sectional view illustrating inner surfaces of a third side edge portion and a second edge portion, and FIG. 11b is a cross-sectional view illustrating inner surfaces a fourth side edge portion and the second edge portion.

FIG. 12 is a cross-sectional view schematically illustrating a state in which a support bar, an inner plate, and a flexible display are coupled.

FIG. 13a is a cross-sectional view of a portion of a flexible display device.

FIG. 13b is a view schematically illustrating a coupling relation between one end portion of a screw shaft and a first holder, and FIG. 13c is a view schematically illustrating a coupling relation between the other end portion of the screw shaft and a second holder.

FIG. 14 is a cross-sectional view illustrating a portion of a flexible display device.

FIG. 15a is a view of a support bar seen from inside, and FIG. 15b is a side view of the support bar of FIG. 15a. FIG. 15c is a cross-sectional view of the support bar of FIG. 15b taken along the line B to B', and FIG. 15d is a cross-sectional view schematically illustrating the support bar of FIG. 15c arranged in plural numbers. FIG. 15e is a cross-sectional view of the support bar of FIG. 15b taken along the line C to C', and FIG. 15f is a cross-sectional view schematically illustrating the support bar of FIG. 15e arranged in plural numbers.

FIG. 16 is a cross-sectional view schematically illustrating a state in which support bars engage engaging protrusions of the roller.

DETAILED DESCRIPTION

Hereinafter, exemplary embodiments disclosed herein will be described in detail with reference to the accompanying drawings. Like reference numerals designate like elements, and redundant description thereof will be omitted. Suffixes "module" and "unit" or "portion" or "part" for elements used in the following description are merely provided for facilitation of preparing this specification, and thus they are not granted a specific meaning or function. In the following description, when it is considered that known functions or structures may confuse the gist of the embodiments of the present disclosure, the known functions or structures are not explained. The accompanying drawings are used to help easily explain various technical features and it should be understood that the embodiments presented herein are not limited by the accompanying drawings. As such, the present disclosure should be construed to extend to any alterations, equivalents and substitutes in addition to those which are particularly set out in the accompanying drawings.

The shapes, sizes, ratios, angles, the number of elements given in the drawings are merely exemplary, and thus, the present disclosure is not limited to the illustrated details. Like reference numerals designate like elements throughout the specification.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to," or "directly coupled to" another element or layer, there may be no intervening elements or layers present.

As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The term "or" as used herein is to be interpreted as an inclusive or meaning any one or any combination. Therefore, "A, B or C" means any of the following: "A; B; C; A and B; A and C; B and C; A, B and C". An exception to this definition will occur only when a combination of elements, functions, steps or acts are in some way inherently mutually exclusive.

A flexible display device described in the present specification may include a mobile terminal such as a portable phone, a smartphone, a laptop computer, a digital broadcast terminal, a personal digital assistant (PDA), a portable multimedia player (PMP), a navigation, a slate PC, a tablet PC, an ultra-book, a wearable device, a smart watch, a smart glass, a head mounted display (HMD), and the like.

It will be apparent to those skilled in the art that the configuration according to the embodiments disclosed in the present specification may be applied to fixed terminals such as a digital TV, a desktop computer, a digital signage, and the like, except for when the configuration is applied only to a mobile terminal. Hereinafter, in the present disclosure, for the convenience of description, the mobile terminal will be first described as an example of the flexible display device.

FIG. 1 is a block diagram for explaining a mobile terminal 100 related to the present disclosure.

The mobile terminal 100 may include a wireless transceiver 110, an input interface 120, a sensor 140, an output interface 150, an interface 160, a memory 170, a controller 180, and a power supply 190. The elements shown in FIG. 1 are not essential to implement the mobile terminal, and the mobile terminal described in this specification may include more or fewer elements than the above-enumerated elements.

More specifically, the wireless transceiver 110 may include one or more modules that enable wireless communications between the mobile terminal 100 and a wireless communication system, between the mobile terminal 100 and another mobile terminal 100, or between the mobile terminal 100 and an external server. Further, the wireless transceiver 110 may include one or more modules connecting the mobile terminal 100 to one or more networks.

The wireless transceiver 110 may include at least one of a broadcast receiving module 111, a mobile communication module 112, a wireless internet module 113, a near field communication module 114, or a position information module 115.

The input interface 120 may include a camera 121 or a video input interface, which are configured to receive input of a video signal, a microphone 122 or an audio input interface, which are configured to receive input of an audio signal, and a user input interface 123 (for example, a touch key or a mechanical key), which is configured to receive an input of information from a user. Voice data or image data collected by the input interface 120 may be analyzed and processed as a control command of the user.

The sensor 140 may include one or more sensors configured to sense at least one piece of information among information in the mobile terminal, surrounding environment information of the mobile terminal, or user information. For example, the sensor 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (for example, a camera 121), a microphone 122, a battery gauge, an environment sensor (for example, a barometer, a hygrometer, a thermometer, a radiation sensor, a thermal sensor, a gas sensor, etc.), and a chemical sensor (for example, an electronic nose, a healthcare sensor, or a biometric sensor). Further, the mobile terminal disclosed in the present specification may combine information sensed by at least two sensors from the above-mentioned sensors and may use the combined information.

The output interface 150 may be for generating outputs related to visual, auditory, or tactile senses, and may include at least one of a display 151, a sound output interface 152, a haptic module 153, or an optical output interface 154. The display 151 may form a mutual layer structure with a touch sensor or may be formed integrally with a touch sensor, to be implemented as a touch screen. The touch screen may serve as a user input interface 123 configured to provide an input interface between the mobile terminal 100 and the user, and at the same time, may provide an output interface between the mobile terminal 100 and the user.

The interface 160 may serve as a passage between the mobile terminal 100 and various types of external devices connected to the mobile terminal 100. The interface 160 may include at least one of a wired/wireless headset port, an external charger port, a wired/wireless data port, a memory card port, a port for connecting a device equipped with an identification module, an audio input/output (I/O) port, a video input/output (I/O) port, or an earphone port. In response to a connection between an external device and the interface 160, the mobile terminal 100 may perform an appropriate control regarding the connected external device.

Further, the memory 170 may store therein data supporting various functions of the mobile terminal 100. The memory 170 may store therein a plurality of application programs (or applications) driven in the mobile terminal 100, data for operations of the mobile terminal 100, and commands. At least some of the application programs may be downloaded from an external server through wireless communication. Further, for the basic functions of the mobile terminal 100 (for example, functions for receiving and making calls and receiving and sending messages), at least some of the application programs may be provided in the mobile terminal 100 from the time of manufacture. The application programs may be stored in the memory 170 and installed on the mobile terminal 100 so as to be driven by the controller 180 to perform operations (or functions) of the mobile terminal 100.

In addition to the operations related to the application programs, the controller 180 may generally control overall operation of the mobile terminal 100. The controller 180 may process a signal, data, or information that is inputted or outputted through the above-described elements or drive the application programs stored in the memory 170 to thereby provide appropriate information or functions to the user or process them.

Further, in order to drive the application programs stored in the memory 170, the controller 180 may control at least one of the elements described with reference to FIG. 1. Moreover, the controller 180 may combine and operate at least two of the elements included in the mobile terminal 100 to drive the application programs.

Under the control of the controller 180, the power supply 190 may be supplied with external power or internal power, and supply power to each element included in the mobile terminal 100. The power supply 190 may include a battery, and the battery may be an internal battery or a replaceable battery.

At least some of the above-described elements may operate in cooperation with each other to implement the operation or control of the mobile terminal or the control method of the mobile terminal according to various embodiments which will be described below. Further, the operation or control of the mobile terminal or the control method of the mobile terminal may be implemented on the mobile terminal by driving at least one application program stored in the memory 170.

Hereinafter, prior to describing various embodiments implemented by the mobile terminal 100 described above, the above-mentioned elements will be described in more detail with reference to FIG. 1.

First, the wireless transceiver 110 will be described. The broadcast receiving module 111 of the wireless transceiver 110 may receive a broadcast signal and/or broadcast-related information from an external broadcast management server through a broadcast channel. The broadcast channel may include a satellite channel and a ground wave channel. The mobile terminal 100 may be provided with two or more broadcast receiving modules for simultaneous reception of at least two broadcast channels or for broadcast channel switching.

The broadcast management server may refer to a server that generates and transmits a broadcast signal and/or broadcast-related information, or a server that is supplied with a previously generated broadcast signal and/or broadcast-related information and transmits the supplied broadcast signal and/or broadcast-related information to the mobile terminal 100. The broadcast signal may include not only a TV broadcast signal, a radio broadcast signal, and a data broadcast signal, but also a broadcast signal obtained by combining a TV broadcast signal or a radio broadcast signal with a data broadcast signal.

The broadcast signal may be encoded according to at least one of technical standards for transmission and reception of a digital broadcast signal (or broadcast schemes, such as ISO, IEC, DVB, or ATSC), and the broadcast receiving module 111 may receive the digital broadcast signal by using an appropriate method meeting the technical specification determined by the technical standards.

The broadcast-related information may refer to information related to a broadcast channel, a broadcast program, or a broadcast service provider. The broadcast-related information may also be provided through the mobile communication network. Here, the broadcasting-related information may be received by the mobile communication module 112.

The broadcast-related information may exist in various forms, such as an electronic program guide of digital multimedia broadcasting (DMB) or an electronic service guide of a digital video broadcast-handheld (DVB-H). The broadcast signal and/or the broadcast-related information received through the broadcast receiving module 111 may be stored in the memory 170.

The mobile communication module 112 may transmit/receive a wireless signal to/from at least one of a base station, an external terminal, or a server on a mobile communication network established according to the technical standards for mobile communications or communication methods (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), and Long Term Evolution-Advanced (LTE-A)).

The wireless signal may include a voice call signal, a video call signal, or various forms of data for transmission or reception of a text/multimedia message.

The wireless internet module 113 may refer to a module for wireless Internet connection, and may be installed in the mobile terminal 100 or installed outside the mobile terminal 100. The wireless internet module 113 may be configured to transmit and receive a wireless signal over a communication network according to wireless Internet technologies.

Wireless Internet technologies may include, for example, wireless LAN (MILAN), wireless fidelity (Wi-Fi), Wi-Fi direct, Digital Living Network Alliance (DLNA), wireless broadband (WiBro), Worldwide Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A). The wireless internet module 113 may transmit and receive data in accordance with at least one wireless Internet technology from among the above-mentioned wireless Internet technologies and wireless Internet technologies that were not described above.

From the viewpoint that the wireless internet connection through, for example, WiBro, HSDPA, HSUPA, GSM, CDMA, WCDMA, LTE, and LTE-A is made through the mobile communication network, the wireless internet module 113, which performs the wireless Internet connection through the mobile communication network, may be understood as one type of the mobile communication module 112.

The near field communication module 114 may be for short-range communications, and may support short-range communications by using at least one of Bluetooth™, radio frequency identification (RFID), infrared data association (IrDA), ultra wideband (UWB), ZigBee, Short-range Communication (NFC), wireless fidelity (Wi-Fi), Wi-Fi Direct, or Wireless Universal Serial Bus (Wireless USB). The near field communication module 114 may support wireless communications, over a near-field wireless communication network, between the mobile terminal 100 and the wireless communication system, between the mobile terminal 100 and another mobile terminal 100, or between the mobile terminal 100 and a network in which another mobile terminal 100 (or external server) is located. The near-field wireless communication network may be a wireless personal area network.

Here, the another mobile terminal 100 may be a wearable device (for example, a smart watch, a smart glass, or a head mounted display (HMD)) capable of exchanging data (or interworking) with the mobile terminal 100 according to the present disclosure. The near field communication module 114 may sense (or recognize) the presence of a wearable device that is capable of communicating with the mobile terminal 100, in the vicinity of the mobile terminal 100. Moreover, when the detected wearable device is a device that has been authenticated to communicate with the mobile terminal 100 according to the present disclosure, the controller 180 may transmit at least a portion of data processed in the mobile terminal 100 to the wearable device through the near field communication module 114. Therefore, the user of the wearable device may use, through the wearable device, the data that have been processed in the mobile terminal 100. For example, according to this, when a phone call is received by the mobile terminal 100, the user may receive the phone call through the wearable device, or when a message is received by the mobile terminal 100, the user may check the received message through the wearable device.

The position information module 115 may be a module for obtaining a position (or a current position) of a mobile terminal, and its representative examples may include a global positioning system (GPS) module or a wireless fidelity (Wi-Fi) module. For example, when a GPS module is utilized, the mobile terminal may obtain the position of the mobile terminal by using a signal transmitted from a GPS satellite. As another example, when a Wi-Fi module is utilized, the mobile terminal may obtain the position of the mobile terminal on the basis of information on a wireless access point (AP) which transmits and receives wireless signals to and from the Wi-Fi module. If necessary, the position information module 115 may alternatively or additionally perform a function of another module of the wireless transceiver 110 to obtain data on the position of the mobile terminal. The position information module 115 may be a module used to obtain the position (or the current position) of the mobile terminal, and is not limited to a module that directly calculates or obtains the position of the mobile terminal.

Next, the input interface 120 may be for receiving input of video information (or signal), audio information (or signal), data, or information inputted by the user. For receiving input of the video information, the mobile terminal 100 may include a camera 121 or a plurality of cameras 121. The camera 121 may process an image frame such as a still image or a moving image obtained by an image sensor in a video call mode or a photographing mode. The processed image frame may be displayed on the display 151 or stored in the memory 170. Further, the plurality of cameras 121 provided in the mobile terminal 100 may be arranged to form a matrix structure, and a plurality of pieces of image information having various angles or focal points may be inputted to the mobile terminal 100 through the plurality of cameras 121 forming the matrix structure. In addition, the plurality of cameras 121 may be arranged to form a stereo structure to obtain left and right images used to implement a stereoscopic image.

The microphone 122 may process an external sound signal into electric voice data. The processed voice data may be utilized in various manners in accordance with the function that is being performed in the mobile terminal 100 (or in accordance with an application program that is being executed). Various noise removal algorithms for removing noise generated during the process of receiving the external sound signal may be implemented in the microphone 122.

The user input interface 123 may be for receiving information from the user, and when information is inputted through the user input interface 123, the controller 180 may control operation of the mobile terminal 100 so as to correspond to the inputted information. The user input interface 123 may include a mechanical input interface (or a mechanical key, such as a button located on a front, rear, or side surface of the mobile terminal 100, a dome switch, a jog wheel, a jog switch, etc.) and a touch type input interface. For example, the touch type input interface may be formed as a virtual key, a soft key, or a visual key displayed on a touch screen through a software process, or as a touch key disposed in a part other than the touch screen. The virtual key or the visual key may be displayed on the touch screen in various shapes, and may include, for example, graphics, text, icons, video, or a combination thereof.

The sensor 140 may sense at least one of information in the mobile terminal, information of the surrounding environment of the mobile terminal, or user information, and generate a sensing signal corresponding to sensed information. On the basis of the sensing signal, the controller 180 may control the driving or operation of the mobile terminal 100 or perform data processing, functions, or operations related to an application program installed in the mobile terminal 100. Representative sensors among various sensors that can be included in the sensor 140 will now be described in more detail.

First, the proximity sensor 141 may be a sensor which senses the presence of an object that is approaching a predetermined sensing surface or of nearby objects, by using the force of an electromagnetic field or infrared ray without any mechanical contact. The proximity sensor 141 may be disposed in an internal area of the mobile terminal 100, which is enclosed by the above-described touch screen, or may be disposed in the vicinity of the touch screen.

Examples of the proximity sensor 141 may include a transmission type photoelectric sensor, a direct reflection type photoelectric sensor, a mirror reflection type photoelectric sensor, a high frequency oscillation type proximity sensor, a capacitive proximity sensor, a magnetic proximity sensor, and an infrared proximity sensor. When the touch screen is a capacitive type, the proximity sensor 141 may be configured to detect proximity of an object by sensing a change in the electric field caused by an approaching object having conductivity. Here, the touch screen (or the touch sensor) itself may be classified as a proximity sensor.

For convenience of description, when an object approaches the touch screen without contacting the touch screen, and it is recognized that the object is located above the touch screen, it is referred to as a "proximity touch." When the object actually touches the touch screen, it is referred to as a "contact touch." A position at which the object proximately touches the touch screen may be a position at which the object vertically corresponds to the touch screen when the object proximately touches the touch screen. The proximity sensor 141 may sense a proximity touch and a proximity touch pattern (for example, a proximity touch distance, a proximity touch direction, a proximity touch speed, a proximity touch time, a proximity touch position, a proximity touch movement state, etc.). As described above, the controller 180 may process data (or information) corresponding to a proximate touch operation and a proximate touch pattern sensed by the proximity sensor 141, and may output visual information corresponding to the processed data on the touch screen. Furthermore, the controller 180 may control the mobile terminal 100 to process different operations or data (or information) depending on whether the touch on the same point on the touch screen is the proximity touch or the contact touch.

The touch sensor may sense a touch (or a touch input) applied to the touch screen (or the display 151) by using at least one of various touch types, such as a resistive film type, a capacitive type, an infrared type, an ultrasonic type, and a magnetic field type.

For example, the touch sensor may be configured to convert a change in pressure that is applied to a specific portion of the touch screen, or a change in capacitance that is generated in a specific portion of the touch screen, into an electrical input signal. The touch sensor may be configured to detect a position where a touch subject which applies a touch onto the touch screen is touched on the touch sensor, the surface area of the touch, the pressure of the touch, and the capacitance at the time of the touch. Here, the touch subject may be an object that applies a touch to the touch sensor, and may include, for example, a finger, a touch pen, a stylus pen, and a pointer.

As described above, when there is a touch input to the touch sensor, a signal or signals corresponding to the touch input may be transmitted to a touch controller. The touch controller may process the signal(s) and then transmit corresponding data to the controller 180. Then, the controller 180 may confirm which area of the display 151 was touched. Here, the touch controller may be a separate element from the controller 180, or may be the controller 180 itself.

The controller 180 may perform a different control or the same control depending on a type of a touch subject touching the touch screen (or a touch key provided other than the touch screen). Whether to perform a different control or the same control depending on the type of touch subject may be determined in accordance with a current operating state of the mobile terminal 100 or an application program that is being executed.

The touch sensor and the proximity sensor described above may, independently or in combination, sense various types of touches on the touch screen, such as a short (or tap) touch, a long touch, a multi touch, a drag touch, a flick touch, a pinch-in touch, a pinch-out touch, a swipe touch, or a hovering touch.

The ultrasonic sensor may recognize position information of a sensing object by using an ultrasonic wave. The controller 180 may be able to calculate a position of a wave generating source from information sensed by an optical sensor and a plurality of ultrasonic sensors. The position of the wave generating source may be calculated by using the property of light that light is much faster than an ultrasonic wave, that is, the time in which light reaches the optical sensor is much shorter than the time in which the ultrasonic wave reaches the ultrasonic sensor. More specifically, the position of the wave generating source may be calculated by using the difference between the arrival time of the ultrasonic wave and the arrival time of the light, with the light as a reference signal.

As an element of the input interface 120, the camera 121 may include at least one of a camera sensor (for example, a CCD or a CMOS), a photo sensor (or an image sensor), or a laser sensor.

The camera 121 and the laser sensor may be combined to sense a touch of a sensing object for a three-dimensional stereoscopic image. The photo sensor may be stacked on a display element and may be configured to scan a motion of the sensing object proximate to the touch screen. More specifically, the photo sensor may be formed by mounting a photo diode and a transistor (TR) in rows/columns to scan an object on the photo sensor by using an electrical signal which changes in accordance with the amount of light applied to the photo diode. That is, the photo sensor may calculate coordinates of a sensing object in accordance with a change in the amount of light, to thereby obtain position information of the sensing object.

The display 151 may display (output) information processed in the mobile terminal 100. For example, the display 151 may display execution screen information of an application program driven in the mobile terminal 100, or user interface (UI) and graphic user interface (GUI) information in accordance with the execution screen information.

Further, the display 151 may be configured as a stereoscopic display which displays a stereoscopic video.

A three-dimensional display type, such as a stereoscopic type (a glasses type), an autostereoscopic type (a glasses-free type), and a projection type (a holographic type), may be applied to the stereoscopic display.

The sound output interface 152 may output audio data received from the wireless transceiver 110 in, for example, a call signal reception mode, a phone-call mode, a recording mode, a voice recognition mode, and a broadcast reception mode, or audio data stored in the memory 170. The sound output interface 152 may also output a sound signal (for example, a call signal reception sound and a message reception sound) related to a function performed in the mobile terminal 100. The sound output interface 152 may include, for example, a receiver, a speaker, and a buzzer.

The haptic module 153 may generate various tactile effects the user can feel. A representative example of the tactile effect generated by the haptic module 153 may be vibration. An intensity and a pattern of the vibration generated in the haptic module 153 may be controlled by the user or a setting of the controller 180. For example, the haptic module 153 may synthesize vibrations different from one another to output the synthesized vibrations, or sequentially output the different vibrations.

In addition to vibration, the haptic module 153 may generate various tactile effects, such as effects by a pin arrangement which vertically moves to a contact skin surface, an injection force or a suction force of air through an injection port or a suction port, grazing on a skin surface, electrode contact, or stimulation of an electrostatic force or effects of reproducing a cold or hot sensation using a heat absorbing or heat emitting element.

The haptic module 153 may not only transmit a tactile effect through direct contact, but may also be implemented to allow the user to feel a tactile effect through muscular sensation of a finger or an arm. Two or more haptic modules 153 may be provided depending on the configuration of the mobile terminal 100.

The optical output interface 154 may output a signal for providing notification of occurrence of an event by using light of a light source of the mobile terminal 100. Examples of the events generated in the mobile terminal 100 may include, for example, message reception, call signal reception, missed call, alarm, schedule notification, email reception, and information reception through an application.

The signal outputted from the optical output interface 154 may be implemented as the mobile terminal 100 emits light of a single color or a plurality of colors to a front surface or a rear surface thereof. The output of the signal may end as the mobile terminal 100 senses confirmation of the event by the user.

The interface 160 may serve as a passage to all external devices that are connected to the mobile terminal 100. The interface 160 may receive data from an external device or may be supplied with the power source and transmit the supplied power source to each element in the mobile terminal 100, or may transmit data in the mobile terminal 100 to an external device. The interface 160 may include, for example, a wired/wireless headset port, an external charger port, a wired/wireless data port, a memory card port, a port for connecting a device equipped with an identification module, an audio input/output (I/O) port, a video input/output (I/O) port, and an earphone port.

The identification module may be a chip in which various information for authenticating a user right of the mobile terminal 100 is stored, and may include a user identification module (UIM), a subscriber identification module (SIM), and a universal subscriber identity module (USIM). A device provided with an identification module (hereinafter, "identification device") may be manufactured in the form of a smart card. Therefore, the identification device may be connected to the mobile terminal 100 through the interface 160.

When the mobile terminal 100 is connected to an external cradle, the interface 160 may serve as a passage through which power is supplied from the cradle to the mobile terminal 100 or a passage through which various command signals inputted to the cradle by a user are transmitted to the mobile terminal 100. Various command signals inputted from the cradle or the power source may serve as a signal for recognizing that the mobile terminal 100 has been precisely mounted in the cradle.

The memory 170 may store a program for operation of the controller 180, or temporarily store inputted/outputted data (for example, a phone book, a message, a still image, and a moving image). The memory 170 may store data on various patterns of vibration or sound outputted when a touch is inputted onto the touch screen.

The memory 170 may include at least one type of storage medium from among a flash memory type, a hard disk type, a solid state disk (SSD) type, a silicon disk drive (SDD) type, a multimedia card micro type, and card type memories (for example, SD or XD memory and the like), a random access memory (RAM), a static random access memory (SRAM), a read only memory (ROM), an electrically erasable programmable read only memory (EEPROM), a programmable read only memory (PROM), a magnetic memory, a magnetic disk, and an optical disk. The mobile terminal 100 may operate in association with a web storage which performs a storage function of the memory 170 on the Internet.

As described above, the controller 180 may control an operation related to application programs and overall operation of the mobile terminal 100. For example, when the state of the mobile terminal 100 satisfies a predetermined condition, the controller 180 may perform a locking function which limits input of a control command of a user for applications or may release the locking function.

Further, the controller 180 may perform control and processing related to voice call, data communication, and video call, or perform a pattern recognition process by which a handwriting input or a picture drawing input performed on the touch screen may be recognized as a text or an image, respectively. Moreover, the controller 180 may control any one element or a combination of a plurality of the elements described above, to implement various embodiments of the mobile terminal 100 according to the present disclosure which will now be described below.

Under the control of the controller 180, the power supply 190 may be supplied with an external power or an internal power and may supply power required for operating each element. The power supply 190 may include a battery, wherein the battery may be an embedded rechargeable battery or may be detachably coupled to a body of the mobile terminal 100 to be charged.

Further, the power supply 190 may be provided with a connection port, and the connection port may be configured as one example of the interface 160 to which an external charger that supplies power for charging the battery is electrically connected.

As another example, the power supply 190 may be configured to wirelessly charge the battery without using the connection port. Here, the power supply 190 may receive power from an external wireless power transmission device by using one or more of an inductive coupling scheme based on a magnetic induction phenomenon or a magnetic resonance coupling scheme based on an electromagnetic resonance phenomenon.

Various embodiments that will now be described below may be implemented in a recording medium which can be read by a computer or a device similar thereto by using software, hardware, or a combination thereof, for example.

The display 151 may display (output) information processed in the mobile terminal 100. For example, the display 151 may display execution screen information of an application program driven in the mobile terminal 100, or user interface (UI) and graphic user interface (GUI) information in accordance with the execution screen information.

The display 151 may include at least one of a liquid crystal display (LCD), a thin film transistor liquid crystal display (TFT LCD), an organic light emitting diode (OLED), a flexible display, a three-dimensional display (3D display), or an electronic ink display (e-ink display).

Further, the display 151 may be two or more displays 151 depending on the implementation of the mobile terminal 100. Here, a plurality of displays 151 may be disposed to be spaced apart from each other or disposed integrally on one surface of the mobile terminal 100, or each of the plurality of displays 151 may be disposed on different surfaces of the mobile terminal 100.

The display 151 may include a touch sensor which senses a touch on the display 151 so as to receive input of a control command in the touch method. When a touch is made on the display 151, the touch sensor may sense the touch, and on the basis of the sensed touch, the controller 180 may generate a control command corresponding to the sensed touch. Contents inputted through the touch method may include letters, numbers, instructions in various modes, and menu items.

The microphone 122 may be configured to receive voice of the user and other sounds. The microphone 122 may be provided in a plurality of positions so as to receive stereo sounds.

The interface 160 may serve as a passage connecting the mobile terminal 100 to external devices. For example, the interface 160 may be at least one of a connection terminal for connection with other devices (for example, an earphone or an external speaker), a port for short-range communications (for example, an infrared port (IrDA port), a Bluetooth port, a wireless LAN port, etc.), or a power supply terminal for supplying power to the mobile terminal 100. The interface 160 may be implemented in the form of a socket accommodating an external card, such as a subscriber identification module (SIM), a user identity module (UIM), and a memory card for storing information.

At least one antenna for wireless communications may be provided in the body of the mobile terminal 100. The antenna may be embedded in the body of the mobile terminal 100 or may be formed in a case. For example, an antenna that forms a part of the broadcast receiving module 111 (see FIG. 1) may be implemented so as to be drawable from the body of the mobile terminal 100. Alternatively, the antenna may be formed as a film type to be attached to an inner surface of a housing, or a case including a conductive material may serve as an antenna.

The power supply 190 (see FIG. 1) for supplying power to the mobile terminal 100 may be provided in the body of the mobile terminal 100. The power supply 190 may be embedded in the body of the mobile terminal 100, or may include a battery 191 outside the body of the mobile terminal 100, the battery 191 being detachable.

The battery 191 may be configured to be supplied with power through a power cable connected to the interface 160. Further, the battery 191 may be configured to be wirelessly charged by a wireless charging device. The wireless charging may be implemented by a magnetic induction scheme or a resonance scheme (magnetic resonance scheme).

An accessory that protects an exterior of the mobile terminal 100 or supports or extends a function thereof may be added to the mobile terminal 100. An example of the accessory may be a cover that covers at least one surface of the mobile terminal 100 or a pouch accommodating the mobile terminal 100. The cover or the pouch, in conjunction with the display 151, may extend the function of the mobile terminal 100. Another example of the accessory may be a touch pen which supports or extends a touch input on the touch screen.

The flexible display device 1 according to the embodiment of the present disclosure may include a flexible display 300 which is configured to be deformed by an external force.

The deformation may be at least one of warping, bending, folding, twisting, rolling, or spreading of a display module. Such a deformable display module may be referred to as a "flexible display." Here, the flexible display 300 may include a general flexible display, an electronic paper (e-paper), and a combination thereof.

A general flexible display refers to a durable display which, while still having characteristics of existing flat panel displays, is produced on a thin and flexible substrate which can be warped, bent, folded, twisted, rolled, and spread like paper, so as to be light in weight and not to be easily broken.

Further, electronic paper is a display technique to which characteristics of general ink are applied. Electronic paper may be different from existing flat panel displays in that electronic paper uses reflection light. Electronic paper may change information thereon by using a twist ball or electrophoresis using a capsule.

Information displayed on the flexible display 300 may include visual information outputted on a curved surface. The visual information may be implemented as the light emission of unit pixels (sub pixels) that are arranged in a matrix form is independently controlled. The unit pixel refers to a minimum unit for implementing one color.

A portion of the flexible display 300 may be in a bent state, not in a flat state. Here, when an external force is applied to the flexible display 300, a portion of the flexible display 300 may be deformed into a flat state, a less bent state, or a more bent state.

The flexible display 300 may be combined with a touch sensor to implement a flexible touch screen. When a touch input is made on the flexible touch screen, the controller 180 (see FIG. 1) may perform control corresponding to the touch input. The flexible touch screen may be configured to sense a touch input while a portion of the flexible display 300 is in the flat state or in the bent state.

A flexible display device 1 according to the example in which the flexible display 300 is deformable may include a deformation sensor capable of sensing deformation in the flexible display 300. The deformation sensor may be included in the sensor 140 (see FIG. 1).

The deformation sensor may be provided in the flexible display 300 or in a body 200, and may sense information related to deformation of the flexible display 300. Here, the information related to the deformation may include information on a direction in which the flexible display 300 is deformed, information on a degree of the deformation of the flexible display 300, information on a position of the deformation in the flexible display 300, information on a time of the deformation, and information on an acceleration at which the deformed flexible display 300 is recovered. In addition to the above information, various other types of information that can be sensed as the flexible display 300 is bent may also be included.

Further, the controller 180 (see FIG. 1) may change information displayed on the flexible display 300 or generate a control signal for controlling a function of the flexible display device 1, on the basis of the information related to the deformation of the flexible display 300 sensed by the deformation sensor.

The deformation of the flexible display 300 may not be limited to the deformation caused by an external force. For example, when the flexible display 300 is in a state in which a portion thereof is spread, the portion may be deformed to be bent by a command of the user or an application.

FIG. 2a is a perspective view of a flexible display device 1 in a first state, and FIG. 2b is a perspective view of the flexible display device 1 of FIG. 2a in a second state in which the flexible display device 1 has been deformed.

FIG. 3a is a rear view of the flexible display device 1 of FIG. 2a, and FIG. 3b is a rear view of the flexible display device 1 of FIG. 2b.

FIG. 4 is an exploded perspective view of the flexible display device 1 of FIG. 2a.

The flexible display device 1 may include a body 200, a plurality of support bars 370, and a roller 400. The body 200 may include a first body 200a and a second body 200b.

In describing embodiments of the present disclosure, a first direction (X direction), a second direction (Y direction), and a third direction (Z direction) shown in the drawings are directions perpendicular to one another.

The flexible display device 1 may include two surfaces 1a and 1b which are opposite to each other. In other words, the flexible display device 1 may include a first surface 1a and a second surface 1b. A direction the first surface 1a faces (i.e. a direction perpendicular to or substantially perpendicular to the first surface 1a) may be opposite to a direction the second surface 1b faces (i.e. a direction perpendicular to or substantially perpendicular to the second surface 1b). In the flexible display device 1, the first surface 1a may face the third direction (Z direction), and the second surface 1b may face a direction opposite to the third direction (Z direction). When the first surface 1a is a front surface of the flexible display device 1, the second surface 1b may be a rear surface of the flexible display device 1.

Hereinafter, unless otherwise specified, the third direction (Z direction) refers to the forward direction of the flexible display device 1, and the direction opposite to the third direction (Z direction) refers to the rearward direction of the flexible display device 1.

The body 200 may form the overall shape of the flexible display device 1. The body 200 may form the frame of the flexible display device 1. The body 200 may be made of a relatively hard material. For example, the body 200 may be made of plastic, carbon, metal, or a combination thereof. Other components of the flexible display device 1 may be coupled to the body 200.

The body 200 may be formed in various shapes so as to support other components coupled thereto.

The body 200 may have a flat shape as a whole, or may have a curved shape such as a curved surface. An interior of the body 200 may be fully filled or may not be fully filled.

For example, when viewed from the front (Z direction), the body 200 may be formed in a quadrangular shape as a whole, and may be flat as a whole.

The body 200 may be divided into two or more parts. As described in detail above, the body 200 may include the first body 200a and the second body 200b, and the first body 200a and the second body 200b may be formed to move relative to each other (see FIGS. 2a, 2b, 3a, and 3b).

The second body 200b may slide and reciprocate relative to the first body 200a. Accordingly, when viewed from the front (Z direction), the total area occupied by the body 200 may change as the second body 200b moves.

The second body 200b may reciprocate relative to the first body 200a between a first position and a second position.

When viewed from the front or rear, the total area occupied by the body 200 (the area of the body 200 projected in the Z direction) may be the smallest when the second body 200b is in the first position (see FIGS. 2a and 3a), and the total area occupied by the body 200 (the area of the body 200 projected in the Z direction) may be the largest when the second body 200b is in the second position (see FIGS. 2b and 3b).

When viewed from the front or rear, the overlapping area between the first body 200a and the second body 200b may be the largest when the second body 200b is in the first position (see FIGS. 2a and 3a), and the overlapping area between the first body 200a and the second body 200b may be the smallest when the second body 200b is in the second position (see FIGS. 2b and 3b).

A movement direction of the second body 200b relative to the first body 200a may be parallel to the first direction (X direction).

The first body 200a may have a predetermined length in the first direction (X direction), and may also have a predetermined length in the second direction (Y direction) orthogonal to the first direction. The first body 200a may have a predetermined length in the third direction (Z direction) orthogonal to the first and second directions, but the length of first body 200a in the third direction may be sufficiently small compared to the lengths thereof in the first and second directions. Accordingly, the first body 200a may be formed to be flat or substantially flat along the first and second directions.

The first body 200a may have a plate shape.

The second body 200b may have a predetermined length in the first and second directions. The second body 200b may have a predetermined length in the third direction, but the length of the second body 200b in the third direction may be sufficiently small compared to the lengths thereof in the first and second directions. Accordingly, the second body 200b may be formed to be flat or substantially flat in the first and second directions.

The second body 200b may have a plate shape.

The first body 200a and the second body 200b may be formed in the shape of plates parallel to each other.

FIG. 5a is a perspective view of a flexible display separated from the flexible display device in the first state, and FIG. 5b is a perspective view of the flexible display of FIG. 5a when the flexible display has been deformed (i.e. when the flexible display device is in a second state).

FIG. 6a is a cross-sectional view of the flexible display device of FIG. 2a taken along the line A to A'. FIG. 6b is a cross-sectional view of the flexible display device of FIG. 6a when the flexible display device has been deformed.

FIG. 7a is a cross-sectional view of the flexible display separated from the flexible display device of FIG. 6a, and FIG. 7b is a cross-sectional view of the flexible display separated from the flexible display device of FIG. 6b.

The roller 400 may include a roller body 410 and a plurality of engagement protrusions 420.

The roller body 410 may form a central body of the roller 400. The roller body 410 may have a constant cross section along the second direction. The roller body 410 may be formed in a cylindrical shape.

Each of the plurality of engagement protrusions 420 may be formed on an outer circumferential surface of the roller body 410 to protrude in a radial direction thereof, and the plurality of engagement protrusions 420 may be repeatedly formed along a circumferential direction of the roller body 410. Accordingly, the engagement protrusions 420 may be repeatedly formed on an outer circumferential surface of the roller 400 along a circumferential direction of the roller 400.

Each of the engagement protrusions 420 may be formed in such a shape that a cross section thereof has a rectangular shape, and the cross section may be constant along the second direction.

The plurality of the engagement protrusions 420 may be identical to one another and may be disposed to be spaced apart from each other at regular intervals.

In the flexible display device 1, the roller 400 may be formed to support a portion of an inner surface of the flexible display 300. That is, a portion of the flexible display 300 may be curved around the roller 400, and a direction of formation of the flexible display 300 may be changed along the circumferential direction of the roller 400.

In addition, the roller 400 may be formed to rotate in both directions about a central axis 401 which is parallel to the second direction. That is, the roller 400 may be coupled to the second body 200b so as to rotate about the central axis 401.

The flexible display 300 may be formed in the form of a thin film, and may have an outer surface and an inner surface. The outer surface of the flexible display 300 may be a surface facing an outside of the flexible display device 1, and the inner surface of the flexible display 300 may be a surface facing an inside of the flexible display device 1. An image may be displayed on at least a portion of the outer surface of the flexible display 300.

When the second body 200b moves relative to the first body 200a, the flexible display 300, which is formed such that at least a portion thereof is curved, may change in shape.

The flexible display 300 may include a first region 310 and a second region 320 which are connected to each other.

The flexible display 300 may include a first region 310, a second region 320, and a third region 330, which are sequentially connected. The flexible display 300 may include a fourth region 340.

If the flexible display 300 is not coupled to the body 200 and is spread flat, the fourth region 340, the first region 310, the second region 320, and the third region 330 may form a single plane.

Broken lines shown in FIG. 2b are imaginary lines respectively representing a boundary between the first region 310 and (a first connected region 321 of) the second region 320, a boundary between the first region 310 and the fourth region 340, and a boundary between the first connected region 321 and a second connected region 322.

The first region 310 may have a predetermined area and may be coupled to the body 200 from any one side of the body 200. The first region 310 may be coupled to the first body 200a, and may be fixed to the first body 200a. That is, the first region 310 may be formed so as not to move relative to the first body 200a.

The first region 310 may be parallel to the first and second directions. The first region 310 may be fixed in front of the first body 200a. The first region 310 may be fixed in front of the first body 200a based on the third direction. The first region 310 and the first body 200a may be coupled to each other so as to be parallel to each other.

In an embodiment of the present disclosure, the first region 310 may form a curved surface as a whole. Here, a curvature of the first region 310 may be smaller than a curvature of the first connected region 321, which will be described below, and a radius of curvature of the first region 310 may be greater than a radius of curvature of the first connected region 321. The radius of curvature of the first region 310 may be sufficiently greater than the radius of curvature of the first connected region 321. For example, when the radius of curvature of the first connected region 321 is "a," the radius of curvature of the first region 310 may be "10*a" or greater.

In another embodiment of the present disclosure, the first region 310 may form a plane surface as a whole. The first region 310 may form a planar outer surface of the flexible display 300 and may be disposed on a front surface of the body 200. The first region 310 may have a constant cross section in the first and second directions.

Hereinafter, description will be made on the assumption that the first region 310 of the flexible display device 1 is a plane surface.

A direction the first region 310 faces (i.e. a direction an outer surface of the first region 310 faces) may be the third direction. The first region 310 may form a part or the entirety of the first surface 1a of the flexible display device 1.

The fourth region 340 may extend from the first region 310 and form an end portion of the flexible display 300. The fourth region 340 may have a constant cross section along the second direction, and may form a curved surface. An image may be displayed on the fourth region 340.

The second region 320 may extend from the first region 310, and a portion of the second region 320 may be curved around the roller 400. That is, a direction of formation of the second region 320 may be changed on the roller 400.

The second region 320 may have a constant cross section along the second direction.

A portion of the second region 320 may be curved into a semicircular shape, and a curved position of the second region 320 may change according to movement of the second body 200b. When the second body 200b is in the first position, the first connected region 321 may be curved into a semicircular shape, and when the second body 200b is in the second position, a portion of the second connected region 322 may be curved into a semicircular shape.

The second region 320 may include the first connected region 321 and a second connected region 322.

The first connected region 321 may be directly connected to the first region 310, and the second connected region 322 may be directly connected to the first connected region 321 and the third region 330.

When the second body 200b is in the first position, the first connected region 321 may form a curved surface along the circumferential direction of the roller 400.

When the second body 200b is in the first position, the first connected region 321 may form an outer surface of the flexible display 300 that is curved about a curvature center line L1. When the second body 200b is in the first position, the curvature center line L1 may be an imaginary straight line that forms a center of curvature of the first connected region 321, and may be parallel to the second direction.

When the second body 200b is in the first position, a cross section of the first connected region 321 may form a semicircular shape.

The curvature center line L1 may coincide with the central axis 401 of the roller 400.

When the second body 200b is in the second position, the curvature center line L1 may be a center of curvature of the second connected region 322 forming a curved surface.

An image may be displayed on the first connected region 321 and the first region 310.

A surface area of the first region 310 may be greater than a surface area of the first connected region 321.

When the second body 200b is in the first position, the second connected region 322 may form an outer surface of the flexible display 300 that is an opposite surface to the first region 310. That is, when the second body 200b is in the first position, and the first region 310 faces the third direction (Z direction), the second connected region 322 may face the opposite direction to the third direction (Z direction). An image may be displayed on the second connected region 322.

The second connected region 322 may have a constant cross section along the second direction. When the second body 200b is in the first position, the second connected region 322 may have a constant cross section along the first direction.

The flexible display 300 may be formed in such a manner that the first region 310, the first connected region 321, and the second connected region 322 are sequentially connected, and when the second body 200b is in the first position, the first region 310, the first connected region 321, and the second connected region 322 may form a U-shape as a whole.

In one embodiment of the present disclosure, when the second body 200b is in the first position, the second connected region 322 may form a curved surface as a whole. Here, a curvature of the second connected region 322 may be smaller than a curvature of the first connected region 321, and a radius of curvature of the second connected region 322 may be greater than a radius of curvature of the first connected region 321. The radius of curvature of the second connected region 322 may be sufficiently greater than the radius of curvature of the first connected region 321. For example, when the radius of curvature of the first connected region 321 is "a," the radius of curvature of the second connected region 322 may be "10*a" or greater.

In another embodiment of the present disclosure, when the second body 200b is in the first position, the second connected region 322 may form a plane surface as a whole. In addition, the second connected region 322 may be parallel to the first region 310. Hereinafter, description will be made on the assumption that when the second body 200b is in the first position, the second connected region 322 forms a plane surface and is parallel to the first region 310.

The third region 330, on the opposite side to the first region 310, may extend from the second region 320. The third region 330 may be formed to extend from the second connected region 322 and may form an end portion of the flexible display 300.

In the flexible display 300, the first region 310, the second region 320, and the fourth region 340 may be configured to display an image thereon, and the third region 330 may be configured not to display an image thereon. In the flexible display 300, the third region 330 may be an extended portion of a display substrate, and may form a dummy portion on which an image is not displayed.

The third region 330 may be formed separately from the flexible display 300 and then be coupled to the flexible display 300. Or, the third region 330 may be formed integrally with the flexible display 300 in the manufacturing process of the flexible display 300. The third region 330 may be formed as a substrate of the flexible display 300.

The third region 330 may be formed in the form of a plastic film, and may be flexibly curved.

The camera 121 may be fixed to a rear surface of the body 200. The camera 121 may be coupled to the body 200 so as to face the opposite direction of the third direction (Z direction).

The camera 121 may be fixed to a rear surface of the first body 200a.

The camera 121 may be fixed to the body 200 at a portion away from the roller 230. That is, if the roller 400 is coupled to the body 200 at a lower portion of the flexible display device 1, the camera 121 may be coupled to the body 200 at an upper portion of the flexible display device 1. The camera 121 may be fixed to an edge of the first body 200a that is farthest from the roller 400.

The camera 121 may be two or more cameras 121 arranged in the second direction.

The first body 200a may include a support plate 230.

The support plate 230 may be formed in a flat plate shape, and may be formed in a size the same as or similar to a size of the first region 310. The support plate 230 may be coupled in a form in which the first region 310 is laminated on an outside (front side) of the support plate 230, and the support plate 230 may support the first region 310 from inside the first region 310.

The first body 200a may include a first edge portion 205.

The first edge portion 205 may form any one edge of the flexible display device 1. The first edge portion 205 may form any one side of the flexible display device 1 having a rectangular shape.

The first edge portion 205 may form an upper side edge of the first body 200a.

The first edge portion 205 may be fixed to the first body 200a. The first edge portion 205 may be integrally formed with the first body 200a, or may be formed separately from the first body 200a and then fixed thereto.

The first edge portion 205 may generally be formed to extend in the second direction (Y direction).

At least a portion of the first edge portion 205 may have a constant cross section in the second direction (Y direction). An outer surface of the first edge portion 205 may form a convex curved surface, and the cross section of the first edge portion 205 may have, for example, a semicircular shape.

The fourth region 340 may be fixed to the first edge portion 205.

The first body 200*a* may include a first side edge portion 210 and a second side edge portion 220. The first side edge portion 210 and the second side edge portion 220 may form edges on both sides of the first body 200*a*, and may extend in the first direction. The first side edge portion 210 may be formed over the entire section of any one edge of the first body 200*a*, or may be formed over a partial section thereof. The second side edge portion 220 may be formed over the entire section of any one edge of the first body 200*a*, or may be formed over a partial section thereof.

The first side edge portion 210 and the second side edge portion 220 may be formed to be parallel to the first direction, and may have constant cross sections in the first direction. If the first side edge portion 210 forms a left side edge of the first body 200*a*, the second side edge portion 220 may form a right side edge of the first body 200*a*.

The second body 200*b* may include a second edge portion 206.

The second edge portion 206 may form an edge of the flexible display device 1 on the opposite side to the first edge portion 205. If the first edge portion 205 forms an upper side edge of the flexible display device 1, the second edge portion 206 may form a lower side edge of the flexible display device 1.

The second edge portion 206 may be disposed at an outer side of the roller 400.

Between the second edge portion 206 and the roller 400, a gap 207, which is relatively narrow, may be provided, and through the gap 207, the flexible display 300 may move, forming a curved surface (see FIGS. 6*a* and 6*b*).

In addition, a connection arm 373 of the support bar 370 may move through the gap 207.

The second edge portion 206 may be fixed to the second body 200*b*. The second edge portion 206 may be integrally formed with the second body 200*b*, or may be formed separately from the second body 200*b* and then fixed thereto.

The second edge portion 206 may generally be formed to extend in the second direction (Y direction).

At least a portion of the second edge portion 206 may have a constant cross section along the second direction (Y direction). An outer surface of the second edge portion 206 may form a convex curved surface, and a cross section of the second edge portion 206 may have a semicircular shape.

The second body 200*b* may include a third side edge portion 250 and a fourth side edge portion 260. The third side edge portion 250 and the fourth side edge portion 260 may form edges on both sides of the second body 200*b*, and may be formed to extend in the first direction. The third side edge portion 250 and the fourth side edge portion 260 may be formed to be parallel to the first direction, and may have constant cross sections along the first direction.

If the third side edge portion 250 forms a left side edge of the second body 200*b*, the fourth side edge portion 260 may form a right side edge of the second body 200*b*.

The third side edge portion 250 may be disposed to align with the first side edge portion 210, and may be disposed so as to come into close contact with the first side edge portion 210 or to be close thereto.

The third side edge portion 250 may be disposed at an outer side of the first side edge portion 210 or at an inner side of the first side edge portion 210.

The fourth side edge portion 260 may be disposed to align with the second side edge portion 220, and may be disposed so as to come into close contact with the second side edge portion 220 or to be close thereto.

The fourth side edge portion 260 may be disposed at an outer side of the second side edge portion 220 or at an inner side of the second side edge portion 220.

The flexible display device 1 may include a back cover 280.

The back cover 280 may be formed in a shape of a plate that is substantially parallel to the first direction (X direction) and the second direction (Y direction). The back cover 280 may be parallel to or substantially parallel to the first region 310.

The back cover 280 may form a rear surface of the second body 200*b*. The back cover 280 may be fixed to the second body 200*b* or may be detachably coupled to the second body 200*b*.

The back cover 280 may be formed to be transparent or opaque.

When the second body 200*b* is in the first position, a surface area of the back cover 280 may correspond to a surface area of the second connected region 322, or may be equal to or greater than the surface area of the second connected region 322.

When the back cover 280 is formed to be transparent, an image displayed on the second connected region 322 while the second body 200*b* is in the first position may be seen through the back cover 280.

The flexible display device 1 according to the embodiment of the present disclosure may include a plurality of support bars 370.

Each of the plurality of support bars 370 may be formed to extend generally in the second direction, and may be fixed to an inner surface of the second region 320. The plurality of support bars 370 may be directly fixed to the second region 320, or may be fixed thereto by means of a separate element.

Each of the plurality of support bars 370 may support the first connected region 321 or the second connected region 322 from inside the first connected region 321 or the second connected region 322, and the plurality of support bars 370 may be disposed one by one along the first connected region 321 and the second connected region 322.

Each of the plurality of support bars 370 may be disposed to be parallel to one another.

The plurality of support bars 370 may be made of a relatively hard material so as to support the flexible display 300. The plurality of support bars 370 may be made of plastic or metal.

The flexible display device 1 may further include an inner plate 350.

The inner plate 350 may be coupled in a form in which the inner plate 350 is stacked on an inner surface of the flexible display 300.

The inner plate 350 may be formed of a metal plate having elasticity. The inner plate 350 may include a superelastic metal. The inner plate 350 may be formed in a shape of a relatively thin plate. The inner plate 350 may have a thickness in the range of 0.05 mm to 0.2 mm, and may have a thickness of 0.1 mm.

According to an embodiment of the present disclosure, the inner plate 350 may be formed in the same or similar size and in the same or similar shape as the flexible display 300 such that the inner plate 350 is coupled to an entire inner surface of the flexible display 300.

According to another embodiment of the present disclosure, the inner plate 350 may be formed in the same or similar size and in the same or similar shape as the second region 320 such that the inner plate 350 is coupled to an inner surface of the second region 320.

The inner plate 350 may facilitate elastic deformation and elastic recovery of the flexible display 300.

When the inner plate 350 is provided in the flexible display device 1, the plurality of support bars 370 may be coupled to the flexible display 300 by means of the inner plate 350. That is, the inner plate 350 may be fixed to the inner surface of the flexible display 300, and the plurality of support bars 370 may be fixed to an inner surface of the inner plate 350.

The flexible display device 1 may further include a sliding plate 360.

The sliding plate 360 may generally be formed in a shape of a flat plate extending along the second direction. The sliding plate 360 may be made of metal, plastic, and the like.

The sliding plate 360 may be fixed to an end portion of the flexible display 300. The sliding plate 360 may be fixed to the third region 330.

The sliding plate 360 may be coupled to the second body 200b such that the sliding plate 360 moves relative to the second body 200b along the first direction.

The sliding plate 360 may be slidably coupled to the second body 200b, and for this, both end portions of the sliding plate 360 may respectively be inserted into a first rear guide groove 252 and a second rear guide groove 262 and move therein.

A state in which some of the plurality of support bars 370 engage engagement protrusions 420 of the roller 400 may be maintained. That is, some of the plurality of support bars 370 may be disposed between the engagement protrusions 420.

Here, the support bars 370 that are fixed to an inner side of a region of the second region 320 that forms a curved surface about the curvature center line may engage the engagement protrusions 420. The support bars 370 that engage the engagement protrusions 420 may form a semicircular shape.

When the flexible display device 1 is deformed between the first state and the second state, a series of support bars 370 may engage the engagement protrusions 420 and disengage therefrom while moving on the roller 400. For example, when the flexible display device 1 is changed from the first state to the second state, the support bars 370 that are not engaging (or contacting) the engagement protrusions 420 may move towards the roller 400 to engage the engagement protrusions 420, and the support bars 370 that are engaging (or contacting) the engagement protrusions 420 may move away from the roller 400.

When a state of the flexible display device 1 is changed from the first state to the second state, the support bars 370 that move in the first direction may engage the engagement protrusions 420 of the roller 400, move along a path having a semicircular shape, and then move away from the roller 400 in the opposite direction of the first direction.

When the state of the flexible display device 1 is changed from the second state to the first state, the support bars 370 that move in the first direction may engage the engagement protrusions 420 of the roller 400, move along the path having a semicircular shape, and then move away from the roller 400 in the opposite direction of the first direction.

When the flexible display device 1 is deformed as the second body 200b moves relative to the first body 200a, the roller 400 may be rotated as the plurality of support bars 370 move. In addition, when the roller 400 is rotated, the plurality of support bars 370 may engage the engagement protrusions 420 to thereby sequentially move and rotate. Accordingly, the amount of movement of a portion of the flexible display 300 that changes direction on the roller 400 may be constant.

FIG. 8 is a plane view of a flexible display device 1 illustrating some elements therein.

FIG. 9a and FIG. 9b are views illustrating the roller 400 illustrated in FIG. 8 moving while rotating about a screw shaft 500.

FIG. 10 is a plane view illustrating some elements inside a flexible display device according to an embodiment of the present disclosure different from the embodiment of the FIG. 8.

The flexible display device 1 may further include a screw shaft 500.

The screw shaft 500 may form a rotational shaft of the roller 400 and may be coupled to the second body 200b. The screw shaft 500 may be formed to extend in the second direction. A length of the screw shaft 500 (i.e. a length thereof in the second direction) may be greater than a length of the roller 400 (i.e. a length thereof in the second direction).

The roller 400 may be screwed onto the screw shaft 500. A screw thread may be formed on an outer circumferential surface of the screw shaft 500 along an axial direction thereof (i.e. the second direction), and a screw groove corresponding to the screw thread of the screw shaft 500 may be formed on an inner circumferential surface of the roller 400. That is, when the screw shaft 500 is formed as a male screw, the roller 400 may be formed as a female screw coupled to the screw shaft 500.

The screw shaft 500 may be coupled so as not to move relative to the second body 200b in the second direction. Accordingly, when the roller 400 rotates relative to the screw shaft 500, the roller 400 may move along the second direction.

The screw shaft 500 may be fixed to the second body 200b.

A length of the screw shaft 500, a diameter of the screw shaft 500, a shape of the screw thread of the screw shaft 500, a form of screw coupling between the screw shaft 500 and the roller 400, and a size and number of the engagement protrusions 420 of the roller 400 may be variously determined according to the specification of the flexible display device 1 (see FIGS. 8 and 10).

In the flexible display device 1 according to an embodiment of the present disclosure, when the second body 200b moves between the first position and the second position, the roller 400 may make two to three rotations or five to fifteen rotations.

According to an embodiment of the present disclosure, the number of all the engagement protrusions 420 of the roller 400 may be 14.

According to an embodiment of the present disclosure, when the roller 400 makes one rotation, the roller 400 may move 3.86 mm (in the second direction). In addition, when the state of the flexible display device 1 is changed between the first state and the second state, the roller 400 may make about 2.12 rotations and may move 8.2 mm (in the second direction).

When the flexible display 300 is deformed as the second body 200b moves relative to the first body 200a, the roller 400 may be rotated as the plurality of support bars 370 move, and the roller 400, which is screwed onto the screw shaft 500, may move in the axial direction thereof (i.e. in the second direction).

Accordingly, slipping in the second direction may occur between the support bars 370 and the engagement protrusions 420 of the roller 400, and the support bars 370 and the engagement protrusions 420 of the roller 400 may be prevented from continuously rubbing against each other at the same point.

The flexible display device 1 may further include a first stopper 510 and a second stopper 520.

The flexible display device 1 may include a first holder 530 and a second holder 540.

The first stopper 510 and the second stopper 520 may move away from each other along the second direction, and may respectively be fixed to opposite end portions of the screw shaft 500.

Diameters of the first stopper 510 and the second stopper 520 may be greater than a diameter of the screw shaft 500.

The first stopper 510 and the second stopper 520 may limit ranges of movement and rotation of the roller 400. That is, when the roller 400 moves in the second direction while rotating about the screw shaft 500, the roller 400 may not be able to move or rotate beyond the first stopper 510 and may not be able to move or rotate beyond the second stopper 520.

When the second body 200b is in the first position, the roller 400 may come into close contact with the first stopper 510, and when the second body 200b is in the second position, the roller 400 may come into close contact with the second stopper 520.

Accordingly, the first stopper 510 and the second stopper 520 may accurately limit the ranges of movement and rotation of the roller 400.

When the second body 200b is in the first position, an attractive force may act between the roller 400 and the first stopper 510, such that the roller 400 comes into close contact with the first stopper 510 or moves close to the first stopper 510 (see FIG. 9a). For the attractive force to act between the roller 400 and the first stopper 510, each of the roller 400 and the first stopper 510 may include a magnet. Or, any one of the roller 400 or the first stopper 510 may include a magnet, and the other one may include metal such as iron.

When the second body 200b is in the second position, an attractive force may act between the roller 400 and the second stopper 520, such that the roller 400 comes into close contact with the second stopper 520 or moves close to the second stopper 520 (see FIG. 9b). For the attractive force to act between the roller 400 and the second stopper 520, each of the roller 400 and the second stopper 520 may include a magnet. Or, any one of the roller 400 or the second stopper 520 may include a magnet, and the other one may include metal such as iron.

According to the embodiment of the present disclosure, each of the first stopper 510 and the second stopper 520 may be made of a magnet or may be formed to include a magnet, and the roller 400 may be made of a metal, such that an attractive force acts between the roller 400 and each of the first stopper 510 and the second stopper 520.

When the flexible display device 1 is in the first state, the roller 400 cannot move beyond the first stopper 510, and if no external force is applied, motion (i.e. movement and rotation) of the roller 400 may be blocked by the magnetic force (i.e. attractive force) between the roller 400 and the first stopper 510.

When the flexible display device 1 is in the second state, the roller 400 cannot move beyond the second stopper 520, and if no external force is applied, motion (i.e. movement and rotation) of the roller 400 may be blocked by the magnetic force (i.e. attractive force) between the roller 400 and the second stopper 520.

Accordingly, when the flexible display device 1 is in the first state and the second state, movements of the support bars 370 and the flexible display 300 may also be blocked, and unintended movement or bending of the flexible display 300 may be prevented.

The first holder 530 and the second holder 540 may be fixed to the second body 200b.

The first holder 530 may support any one end portion 501 of the screw shaft 500, and the second holder 540 may support the other end portion 502 of the screw shaft 500. That is, the first holder 530 and the second holder 540 may support both end portions of the screw shaft 500.

The one end portion 501 of the screw shaft 500 may pass through the first stopper 510 to be coupled to the first holder 530, and the other end portion 502 of the screw shaft 500 may pass through the second stopper 520 to be coupled to the second holder 540.

The screw shaft 500 may be coupled to the first holder 530 and the second holder 540 so as not to rotate relative to the first holder 530 and the second holder 540.

FIG. 11a is a cross-sectional view illustrating inner surfaces of a third side edge portion 250 and a second edge portion 206, and FIG. 11b is a cross-sectional view illustrating inner surfaces of a fourth side edge portion 260 and the second edge portion 206.

FIG. 12 is a cross-sectional view schematically illustrating a state in which the support bar 370, the inner plate 350, and the flexible display 300 are coupled.

The second body 200b may include a first movement guide groove 251 and a second movement guide groove 261.

The first movement guide groove 251 may be formed as a U-shaped groove, and may form a path into which a first support slider 371, which will be described below, is inserted and moves therein.

The second movement guide groove 261 may be formed as a U-shaped groove, and may form a path into which a second support slider 372, which will be described below, is inserted and moves therein.

The first movement guide groove 251 may include a first rear guide groove 252, a first front guide groove 253, and a first connection guide groove 254.

The second movement guide groove 261 may include a second rear guide groove 262, a second front guide groove 263, and a second connection guide groove 264.

The first rear guide groove 252 and the first front guide groove 253 may be formed in the third side edge portion 250, and the second rear guide groove 262 and the second front guide groove 263 may be formed in the fourth side edge portion 260.

In one embodiment of the present disclosure, the first connection guide groove 254 may be formed in the third side edge portion 250, and the second connection guide groove 264 may be formed in the fourth side edge portion 260. In another embodiment of the present disclosure, the first connection guide groove 254 and the second connection guide groove 264 may be formed in the second edge portion 206.

The first rear guide groove 252 may form a space inside the third side edge portion 250, may have a constant cross section along the first direction, and may be formed to be open inwards from a rear side of the third side edge portion 250.

The first front guide groove 253 may form a space inside the third side edge portion 250, may have a constant cross section along the first direction, and may be formed to be open inwards from a front side of the third side edge portion 250. The first front guide groove 253 may be symmetric with respect to the first rear guide groove 252.

The first connection guide groove 254 may form a semicircular-shaped space inside the second edge portion 206 of the second body 200b and may connect the first rear guide groove 252 to the first front guide groove 253.

The first rear guide groove 252, the first connection guide groove 254, and the first front guide groove 253 may form a U-shaped space together, and may form a movement path of the plurality of support bars 370 (in particular, the first support slider 371) to serve as a rail, which will be described below.

The second rear guide groove 262 may form a space inside the fourth side edge portion 260, may have a constant cross section along the first direction, and may be formed to be open inwards from a rear side the fourth side edge portion 260.

The second front guide groove 263 may form a space inside the fourth side edge portion 260, may have a constant cross section along the first direction, and may be formed to be open inwards from a front side of the fourth side edge portion 260. The second front guide groove 263 may be symmetric with respect to the second rear guide groove 262.

The second connection guide groove 264 may form a semicircular-shaped space inside the second edge portion 206 of the second body 200b and may connect the second rear guide groove 262 to the second front guide groove 263.

The second rear guide groove 262, the second connection guide groove 264, and the second front guide groove 263 may form a U-shaped space together, and may form a movement path of the plurality of support bars 370 (in particular, the second support slider 372) to serve as a rail, which will be described below.

The first rear guide groove 252, the first front guide groove 253, and the first connection guide groove 254 may respectively be symmetric to the second rear guide groove 262, the second front guide groove 263, and the second connection guide groove 264.

Each of the plurality of support bars 370 may be formed to extend in the second direction (Y direction) as a whole.

Each of the plurality of support bars 370 may include a first support slider 371, a second support slider 372, and a connection arm 373.

The first support slider 371 may form an end portion of the support bars 370 at one side thereof.

The first support slider 371 may be inserted into the first rear guide groove 252, the first connection guide groove 254, and the first front guide groove 253, so as to move along the space (path) formed by the first rear guide groove 252, the first connection guide groove 254, and the first front guide groove 253.

The second support slider 372 may form the other end portion of the support bars 370 at the opposite side to the first support slider 371.

The second support slider 372 may be inserted into the second rear guide groove 262, the second connection guide groove 264, and the second front guide groove 263, so as to move along the space (path) formed by the second rear guide groove 262, the second connection guide groove 264, and the second front guide groove 263.

The connection arm 373 may have a constant cross section along the second direction (Y direction).

The connection arm 373 may connect the first support slider 371 to the second support slider 372, may support an inner surface of the flexible display 300, and may assist in maintaining the first connected region 321 and the second connected region 322 in a stable plane surface or curved surface.

The connection arm 373 may be formed in such a shape that a cross section thereof is a trapezoid (i.e. in a shape in which a width of the connection arm 373 becomes increasingly smaller away from a rear surface of the flexible display 300).

The plurality of support bars 370 may have a predetermined thickness such that when the plurality of support bars 370, which are successively arranged, form a plane parallel to the first region 310, the second region 320, which is supported by the support bars 370, are maintained stable like the first region 310.

A front surface of the connection arm 373 and a front surface of the support plate 230 may form a single plane.

The second region 320 may be maintained in a stable state by means of the support bars 370. In particular, when the second region 320 is formed as a touch screen to receive a touch input, the second region 320 may be stably supported by the support bars 370.

FIG. 13a is a cross-sectional view of a portion of the flexible display device 1.

FIG. 13b is a view schematically illustrating a coupling relation between the one end portion 501 of the screw shaft 500 and the first holder 530, and FIG. 13c is a view schematically illustrating a coupling relation between the other end portion 502 of the screw shaft 500 and the second holder 540.

FIG. 14 is a cross-sectional view illustrating a portion of the flexible display device 1.

The flexible display device 1 may further include a tension maintaining part 600.

The tension maintaining part 600 may be disposed at an outer side of the roller 400. A gap 207 may be formed between the tension maintaining part 600 and the roller 400, wherein the second region 320 may move through the gap 207.

The tension maintaining part 600 may be fixed to the second edge portion 206.

The tension maintaining part 600 may be made of a magnet.

The roller 400 may be made of metal such that a magnetic force acts between the roller 400 and the tension maintaining part 600. The roller 400 may be formed in such a manner that an attractive force acts between the roller 400 and the tension maintaining part 600.

The roller 400 may be coupled to the second body 200b so as to reciprocate along a direction parallel to the first direction. In an embodiment, a shaft of the screw shaft 500, which is the rotational shaft of the roller 400, may be coupled to the second body 200b in such a manner that the roller 400 moves in the direction parallel to the first direction, and a hole that supports the shaft of the screw shaft 500 may be formed in an elongated shape extending in the first direction.

In one embodiment of the present disclosure, a first support hole 531 may be formed in an inner surface of the first holder 530, and a second support hole 541 may be formed in an inner surface of the second holder 540.

The first support hole 531 may be formed in the form of a groove that is concave in the second direction or of a hole in the first holder 530. A length of the first support hole 531 in the first direction (i.e. diameter d1) may be greater than a length of the first support hole 531 in the third direction (i.e. diameter d2).

The second support hole 541 may be formed in the form of a groove that is concave in the second direction or of a hole in the second holder 540. A length of the second support hole 541 in the first direction (i.e. diameter d1) may be greater than a length of the second support hole 531 in the third direction (i.e. diameter d2).

The one end portion 501 of the screw shaft 500 may be inserted into the first support hole 531, and the other end portion 502 of the screw shaft 500 may be inserted into the second support hole 541. The screw shaft 500 may be coupled to the first holder 530 and the second holder 540 in such a manner that the screw shaft 500 does not rotate relative to the first holder 530 and the second holder 540 but reciprocates relative to the first holder 530 and the second holder 540 along the first direction.

To this end, cross sections of the end portions 501 and 502 of the screw shaft 500 may have a shape other than a circular shape. In an embodiment, the cross sections of the end portions 501 and 502 of the screw shaft 500 may have a generally square shape, and in another embodiment, may be formed in an oval shape extending in the first direction. Here, diameters of the end portions 501 and 502 of the screw shaft 500 in the third direction may be the same as or correspond to the diameters (d2) of the first support hole 531 and the second support hole 541 in the third direction, such that no clearance exists between the end portions 501 and 502 and the first and second support holes 531 and 541 in the third direction while the end portions 501 and 502 are respectively inserted into the first and second support holes 531 and 541.

In the flexible display device 1 described in detail above, a portion of the second region 320 of the flexible display 300 that forms a curved surface may be pressed by the roller 400, and thus may move in the second direction relative to the second body 200b.

Within the scope where a balance is maintained between tension acting on the flexible display (in particular, on the second region thereof) and the attractive force acting between the roller 400 and the tension maintaining part 600, the portion of the second region 320 of the flexible display 300 that forms a curved surface may be pressed by the roller 400 and may move in the second direction relative to the second body 200b.

At one point of time, when the tension acting on the flexible display (in particular, on the second region thereof) is relatively smaller than the attractive force acting between the roller 400 and the tension maintaining part 600 (that is, when the tension is loose), the roller 400 may move towards the tension maintaining part 600 (that is, in the first direction). Here, the roller 400 may pull a portion of the flexible display 300 that forms a curved surface (that is, where the flexible display 300 is curved into a U-shape), and accordingly, the tension acting on the flexible display 300 may increase.

At another point of time, when the tension acting on the flexible display (in particular, on the second region thereof) is relatively larger than the attractive force acting between the roller 400 and the tension maintaining part 600 (that is, when the tension is tight), the roller 400 may move away from the tension maintaining part 600 (that is, in the opposite direction of the first direction). Here, a force acting between the roller 400 and a portion of the flexible display 300 that forms a curved surface (that is, where the flexible display 300 is curved into a U-shape) may weaken, and accordingly, the tension acting on the flexible display 300 may decrease.

That is, when the flexible display 300 is deformed as the state of the flexible display device 1 is changed between the first state and the second state, tension may act on the flexible display 300 within a predetermined scope, which may stably maintain the U-shape of the flexible display 300 and prevent unintended curving or loosening of the flexible display 300.

The engagement protrusion 420 may be coated with a coating layer 430, and the coating layer 430 may be made of a material having superior lubricity or greater elasticity compared to the engagement protrusion 420. The coating layer 430 may be made of, for example, a rubber material having elasticity, or an engineering plastic.

When the engagement protrusions 420 engage the support bars 370, the coating layer 430, which is formed on the engagement protrusions 420, may reduce friction occurring between the engagement protrusions 420 and the support bars 370, and may prevent an excessive load from being applied to the engagement protrusions 420 and the support bars 370.

The plurality of support bars 370 may be made of various materials so as to effectively engage the engagement protrusions 420 and smoothly move.

As illustrated in FIG. 12, in an embodiment, each of the plurality of support bars 370 may be formed in such a shape that the cross section thereof (i.e. a cross section of the connection arm) has a triangular shape.

FIG. 15a is a view of a support bar 370 seen from inside, and FIG. 15b is a side view of the support bar 370 of FIG. 15a. FIG. 15c is a cross-sectional view of the support bar 370 of FIG. 15b taken along the line B to B', and FIG. 15d is a cross-sectional view schematically illustrating the support bar 370 of FIG. 15c arranged in plural numbers. FIG. 15e is a cross-sectional view of the support bar 370 of FIG. 15b taken along the line C to C', and FIG. 15f is a cross-sectional view schematically illustrating the support bar 370 of FIG. 15e arranged in plural numbers.

FIG. 16 is a cross-sectional view schematically illustrating a state in which support bars 370 engage engaging protrusions 420 of the roller 400.

In the flexible display device 1 according to the embodiment of the present disclosure, each of the plurality of support bars 370 may protrude from an inner surface of the inner plate 350 in a vertical direction thereof. In addition, the cross section of the support bar 370 at a portion where the support bar 370 comes into contact with the engaging protrusion 420 may have a rectangular shape, and the cross section may be constant along the second direction.

The plurality of the support bars 370 may be identical to one another and may be disposed to be spaced apart from each other at regular intervals.

As described above, each of the plurality of support bars 370 may include a first support slider 371, a second support slider 372, and a connection arm 373, wherein the connection arm 373 may include a support portion 373a, an engagement portion 373b, and non-engagement portions 373c and 373d.

The support portion 373a may be formed to extend in the second direction. The support portion 373a may be formed over the entire section of the connection arm 373.

The support portion 373a may be formed in a plate shape, and may have a constant cross section along the second direction. An outer surface of the support portion 373a may face an inner surface of the flexible display 300 or an inner surface of the inner plate 350.

The support portion 373a may be formed to have a width of W1 along the second direction. If the support portion 373a does not have a constant width along the second direction, W1 may refer to the smallest width of the support portion 373a.

The engagement portion 373b may be formed to protrude inwards from an inner surface of the support portion 373a. The engagement portion 373b may not be formed to cover the entire length of the connection arm 373 (i.e. a length thereof in the second direction), but may be formed in a central portion of the connection arm 373.

The engagement portion 373b may be a portion that comes into contact with the engagement protrusion 420.

The engagement portion 373b may be formed to extend in the second direction. The support portion 373a may be formed to have a width of W2 along the second direction. If the engagement portion 373b does not have a constant width along the second direction, W2 may refer to the smallest width of the engagement portion 373b.

The non-engagement portions 373c and 373d may be formed to protrude inwards from an inner surface of the support portion 373a. The non-engagement portions 373c and 373d may not be formed to cover the entire length of the connection arm 373 (i.e. the length thereof in the second direction), but formed in a portion of the connection arm 373 where the engagement portion 373b is not formed.

The non-engagement portions 373c and 373d may respectively be formed on opposite sides of the engagement portion 373b. Accordingly, the non-engagement portions 373c and 373d may be divided into a first non-engagement portion 373c and a second non-engagement portion 373d. The first non-engagement portion 373c and the second non-engagement portion 373d may be symmetrical to each other.

The first non-engagement portion 373c and the second non-engagement portion 373d may be portions that do not come into contact with the engagement protrusion 420.

The first non-engagement portion 373c and the second non-engagement portion 373d may be formed to extend in the second direction. The first non-engagement portion 373c and the second non-engagement portion 373d may be formed in such a shape that widths thereof become smaller towards an inner side thereof. In an embodiment, the first non-engagement portion 373c and the second non-engagement portion 373d may be formed in such a shape that cross sections thereof have a trapezoid shape.

Each of the first non-engagement portion 373c and the second non-engagement portion 373d may have an root width of W3 and an tip width of W4.

When the widths of the first non-engagement portion 373c and the second non-engagement portion 373d change along the second direction, W3 may refer to the smallest root width of the first non-engagement portion 373c and the second non-engagement portion 373d, and W4 may refer to the smallest tip width of the first non-engagement portion 373c and the second non-engagement portion 373d.

The flexible display device 1 according to the embodiment of the present disclosure may be formed such that $W1 \geq W3 > W4 \geq W2$.

Accordingly, the engagement portion 373b may stably engage the engagement protrusion 420 of the roller 400, and the distance between the plurality of support bars 370 may be minimized. That is, the distance between a plurality of support portions 373a may be minimized, and the support bars 370 may support the entirety of the second region 320 of the flexible display 300.

In addition, the first non-engagement portion 373c and the second non-engagement portion 373d, which are respectively formed on opposite sides of the engagement portion 373b, may improve rigidity of the plurality of support bars 370 as a whole, and thus a stable structure of the plurality of support bars 370 may be maintained.

While specific exemplary embodiments of the present disclosure have been described above and illustrated, it will be understood by those skilled in the art that the present disclosure is not limited to the described exemplary embodiments, and various changes and modifications may be made to the present disclosure without departing from the spirit and the scope of the present disclosure. Therefore, the scope of the present disclosure is not limited to the above-described exemplary embodiments, but shall be defined by the technical thought as recited in the following claims.

INDUSTRIAL APPLICABILITY

The flexible display device according to the embodiments of the present disclosure has high industrial applicability, in that when the second body moves relative to the first body from the first position to the second position, the roller rotates with the engagement protrusions and the support bars engaging each other, and the second region of the flexible display is uniformly deformed and moved.

What is claimed is:

1. A display device comprising: a first body; a second body configured to move relative to the first body along a first direction or the opposite direction of the first direction between a first position and a second position; a roller coupled to the second body and configured to rotate about a rotational axis aligned in a second direction perpendicular to the first direction and the opposite direction of the first direction, wherein a plurality of engagement protrusions are formed along an outer circumferential surface of the roller; a flexible display comprising a first region fixed at a front of the first body and a second region extending from the first region, wherein a portion of the second region is curved around the roller; a plurality of support bars aligned in the second direction and fixed to an inner surface of the second region, wherein the plurality of support bars are configured to engage with the plurality of engagement protrusions of the roller; and a screw shaft coupled to the second body to form a rotational shaft of the roller, wherein the roller is screwed onto the screw shaft; wherein a first stopper and a second stopper are respectively fixed to opposite end portions of the screw shaft and configured to limit a rotational range of the roller.

2. The display device of claim 1, wherein the support bars engaged with the engagement protrusions form a semicircular shape.

3. The display device of claim 1,
wherein the second region comprises:
  a first connected region extending from the first region; and
  a second connected region extending from the first connected region,
wherein when the second body is in the first position, the first connected region is curved around the roller, and a plane of the second connected region is parallel to a plane of the first region, and
wherein when the second body is in the second position, the first connected region is coplanar with the first region, and a portion of the second connected region is curved around the roller.

4. The display device of claim 1, wherein when the second body moves between the first position and the second position, the roller makes two to three rotations.

5. The display device of claim 1, wherein when the second body is in the first position, rotation of the rover is limited by the first stopper, and when the second body is in the second position, rotation of the roller is limited by the second stopper.

6. The display device of claim 1, wherein: as the second body is moved toward the first position, an attractive force acts between the rover and the first stopper as the roller approaches the first stopper; and as the second body is moved toward the second position, an attractive force acts between the rover and the second stopper as the rover approaches the second stopper.

7. The display device of claim 1, further comprising a magnetic tension maintaining part disposed at an outer side of the roller,
wherein a gap is formed between the tension maintaining part and the roller such that the second region moves through the gap, and
wherein the roller is made of a metal material such that magnetic force acts between the roller and the magnetic tension maintaining part.

8. The display device of claim 7, wherein the roller is coupled to the second body so as to move with the second body along the first direction or the opposite direction of the first direction.

9. The display device of claim 1,
wherein each of the plurality of engagement protrusions has cross section which radially protrudes from the outer circumferential surface of the roller and is constant in shape along the second direction,
wherein the plurality of the engagement protrusions are identical to one another and are disposed to be spaced apart from each other at regular intervals,
wherein each of the plurality of support bars protrudes from the inner surface of the second region and has a cross section shape that is constant along the second direction and is configured to be engaged between two of the plurality of engagement protrusions, and
wherein the plurality of the support bars are identical to one another and are disposed to be spaced apart from each other at regular intervals.

10. The display device of claim 1,
wherein each of the plurality of support bars comprises:
a support portion formed to extend along the second direction and have a width in the first direction of W1;
an engagement portion formed at a first portion along the second direction of the support bar and configured to protrude from an inner surface of the support portion and contact the engagement protrusions, wherein the engagement portion has a width in the first direction of W2; and
a non-engagement portion formed at a second portion along the second direction of the support bar and configured protrude from the inner surface of the support portion, wherein the non-engagement portion has a root width of W3 and a tip width of W4 in the first direction,
wherein W1≥W3>W4≥W2.

11. The display device of claim 1,
wherein each of the plurality of support bars comprises:
a first support slider disposed at one end of the support bar;
a second support slider disposed at the other end of the support bar opposite the first support slider; and
a connection arm connecting the first support slider and the second support slider and configured to support the second region,
wherein the second body comprises:
a first movement guide groove formed as a U-shaped groove into which the first support slider is inserted, and configured to form a path through which the first support slider moves; and
a second movement guide groove formed as a U-shaped groove into which the second support slider is inserted, and configured to form a path through which the second support slider moves.

12. The display device of claim 1,
wherein the second body comprises:
a first rear guide groove formed as a groove positioned toward a rear of the second body and extending along the first direction;
a first front guide groove formed as a groove positioned toward a front of the second body and extending along the first direction;
a first connection guide groove formed in a semicircular shape about the rotational axis of the roller and formed as a groove connecting the first rear guide groove and the first front guide groove;
a second rear guide groove positioned at an opposite lateral side of the second body with respect to the first rear guide groove, wherein the second rear guide groove is formed as a groove positioned toward the rear of the second body and extending along the first direction;
a second front guide groove positioned at the opposite lateral side of the second body with respect to the first front guide groove, wherein the second front guide groove is formed as a groove positioned toward the front of the second body and extending along the first direction; and
a second connection guide groove formed in a semicircular shape about the rotational axis of the roller and formed as a groove connecting the second rear guide groove and the second front guide groove,
wherein each of the plurality of support bars comprises:
a first support slider configured to be inserted into and slide along the first rear guide groove, the first connection guide groove, and the first front guide groove;
a second support slider configured to be inserted into and slide along the second rear guide groove, the second connection guide groove, and the second front guide groove; and
a connection arm connecting the first support slider and the second support slider.

13. The display device of claim 12,
wherein the first body comprises a support plate configured to support the first region, and
wherein a front surface of the support plate is aligned with a front surface of one or more connection arms coupled to a portion of the second region that is coplanar with the first region.

14. A display device comprising: a first body; a second body configured to move relative to the first body along a first direction and the opposite direction of the first direction; a flexible display comprising a first region positioned at a front of the display device and a second region extending from the first region, wherein the first region is coupled to the first body; a flexible inner support formed of a metal material and coupled to an inner surface of the second region; a roller coupled to the second body and configured to rotate about a rotational axis aligned in a second direction perpendicular to the first direction and the opposite direction of the first direction, wherein a plurality of engagement protrusions are formed along an outer circumferential surface of the roller; a plurality of support bars disposed at an inner surface of the flexible inner support to be spaced apart from each other, wherein the plurality of support bars are configured to engage with the plurality of engagement protrusions of the roller; and a screw shaft coupled to the second body to form a rotational shaft of the roller; wherein a first stopper and a second stopper are respectively fixed to opposite end portions of the screw shaft and configured to limit a rotational range of the roller.

15. The display device of claim 14, wherein the plurality of engagement protrusions are coated with a coating layer having a superior lubricity or greater elasticity than the plurality of engagement protrusions.

16. The display device of claim 14, wherein each of the first stopper and the second stopper comprises a magnet, and the roller is made of metal such that an attractive force acts between the roller and the first stopper or between the roller and the second stopper.

17. The display device of claim 16, further comprising a magnetic tension maintaining part disposed at an outer side of the roller,
- wherein a gap is formed between the magnetic tension maintaining part and the roller such that the second region moves through the gap,
- wherein an attractive force acts between the roller and the magnetic tension maintaining part, and
- wherein the roller is coupled to the second body so as to move with the second body along the first direction or the opposite direction of the first direction.

* * * * *